(12) United States Patent
Vadai et al.

(10) Patent No.: US 9,131,557 B2
(45) Date of Patent: Sep. 8, 2015

(54) EFFICIENT ILLUMINATION SYSTEM FOR LEGACY STREET LIGHTING SYSTEMS

(75) Inventors: Ephraim Vadai, Nes Ziona (IL); Amit Shefi, Moshav Aseret (IL); Tzvika Herbst, Elad (IL)

(73) Assignee: Led Net Ltd., Bnei-Brak (IL)

(*) Notice: Subject to any disclaimer, the term of this patent is extended or adjusted under 35 U.S.C. 154(b) by 271 days.

(21) Appl. No.: 12/629,965

(22) Filed: Dec. 3, 2009

(65) Prior Publication Data

US 2011/0134239 A1  Jun. 9, 2011

(51) Int. Cl.
*H04N 7/18* (2006.01)
*H05B 33/08* (2006.01)
*F21S 2/00* (2006.01)
*F21S 8/08* (2006.01)
*F21V 19/00* (2006.01)
*F21V 23/06* (2006.01)
(Continued)

(52) U.S. Cl.
CPC .............. *H05B 33/0803* (2013.01); *F21K 9/13* (2013.01); *F21S 2/00* (2013.01); *F21S 8/086* (2013.01); *F21V 19/006* (2013.01); *F21V 23/0457* (2013.01); *F21V 23/0471* (2013.01); *F21V 23/06* (2013.01); *F21V 29/773* (2015.01); *H05B 33/083* (2013.01); *H05B 37/0245* (2013.01); *F21V 5/007* (2013.01); *F21V 5/04* (2013.01); *F21V 29/02* (2013.01); *F21W 2131/103* (2013.01); *F21Y 2101/02* (2013.01); *F21Y 2105/001* (2013.01); *Y02B 20/341* (2013.01); *Y02B 20/383* (2013.01); *Y02B 20/72* (2013.01)

(58) Field of Classification Search
CPC .......... F21V 19/0025; F21K 9/00; F21S 8/086
USPC ........................................................ 348/143
See application file for complete search history.

(56) References Cited

U.S. PATENT DOCUMENTS 7,347,706 B1    3/2008  Wu et al.
2006/0087854 A1  4/2006  Farmer
(Continued)

FOREIGN PATENT DOCUMENTS

CN         1936417      3/2007
CN        101358691     2/2009
(Continued)

OTHER PUBLICATIONS

Communication Relating to the Results of the Partial International Search Dated Feb. 28, 2011 From the Partial International Search Re. Application No. PCT/IL2010/000943.
(Continued)

*Primary Examiner* — Richard Torrente

(57) ABSTRACT

An LED lamp for outdoor and large space lighting, particularly for streets, warehouses car parks and the like, is adapted for fitting into legacy light fittings designed for sodium bulbs and the like. The LED lamp includes light emitting diodes arranged over a surface of the lamp, is rotatably connected through a rotatable electrical connection to a screw-in adaptor for insertion into a legacy screw-in socket, such that the screw in adaptor is rotatable independently of the lamp, so that the legacy screw in socket can be used even though the light fitting is too small to allow rotation of the LED lamp. Additional variants provide for cooling airflow through the light fitting, for temperature control of the LEDs, and for failure protection, to ensure a longest possible lamp lifetime.

5 Claims, 25 Drawing Sheets

(51) Int. Cl.
*H05B 37/02* (2006.01)
*F21V 23/04* (2006.01)
*F21K 99/00* (2010.01)
*F21V 29/77* (2015.01)
*F21V 29/02* (2006.01)
*F21W 131/103* (2006.01)
*F21Y 101/02* (2006.01)
*F21Y 105/00* (2006.01)
*F21V 5/00* (2015.01)
*F21V 5/04* (2006.01)

(56) References Cited

U.S. PATENT DOCUMENTS

| | | | |
|---|---|---|---|
| 2007/0132602 A1* | 6/2007 | Ito et al. | 340/641 |
| 2009/0185376 A1* | 7/2009 | Yu | 362/253 |
| 2009/0196038 A1 | 8/2009 | Vargas Maciel | |
| 2009/0244901 A1* | 10/2009 | Hu et al. | 362/294 |
| 2010/0053967 A1* | 3/2010 | Bertram et al. | 362/249.02 |
| 2010/0141153 A1* | 6/2010 | Recker et al. | 315/149 |
| 2011/0006689 A1* | 1/2011 | Blanchard et al. | 315/121 |
| 2012/0243231 A1 | 9/2012 | Vadai et al. | |

FOREIGN PATENT DOCUMENTS

| | | |
|---|---|---|
| CN | 101545602 | 9/2009 |
| CN | 100549499 | 10/2009 |
| DE | 10201053 | 8/2002 |
| DE | 102006003045 | 7/2007 |
| DE | 1020088036020 | 6/2009 |
| EP | 1975505 | 10/2008 |
| EP | 2020828 | 2/2009 |
| GB | 2374715 | 10/2002 |
| WO | WO 2009/077177 | 6/2009 |
| WO | WO 2009072033 A2 * | 6/2009 ............ F04D 33/00 |

OTHER PUBLICATIONS

International Preliminary Report on Patentability Dated Jun. 14, 2012 From the International Bureau of WIPO Re. Application No. PCT/IL2010/000943.
Communication Relating to the Results of the Partial International Search Dated Feb. 28, 2011 From the International Searching Authority Re. Application No. PCT/IL2010/000943.
International Search Report and the Written Opinion Dated May 6, 2011 From the International Searching Authority Re. Application No. PCT/IL2010/000943.
Official Action Dated Oct. 25, 2013 From the US Patent and Trademark Office Re. U.S. Appl. No. 13/512,918.
Notification of Office Action Dated May 5, 2014 From the State Intellectual Property Office of the People's Republic of China Re. Application No. 201080063155.X and Its Translation Into English.
Office Action Dated Jan. 30, 2014 From the Israel Patent Office Re. Application No. 220127 and Its Translation Into English.
Communication Under Rule 164(2)(a) EPC Dated Dec. 22, 2014 From the European Patent Office Re. Application No. 10795057.8.
Official Action Dated Jul. 15, 2014 From the US Patent and Trademark Office Re. U.S. Appl. No. 13/512,918.
Notification of Office Action and Search Report Dated Mar. 16, 2015 From the State Intellectual Property Office of the People's Republic of China Re. Application No. 201080063155.X and Its Translation Into English.
Communication Pursuant to Article 94(3) EPC Dated Jun. 30, 2015 From the European Patent Office Re. Application No. 10795057.8.
Office Action Dated Jun. 23, 2015 From the Israel Patent Office Re. Application No. 220127 and Its Translation Into English.

* cited by examiner

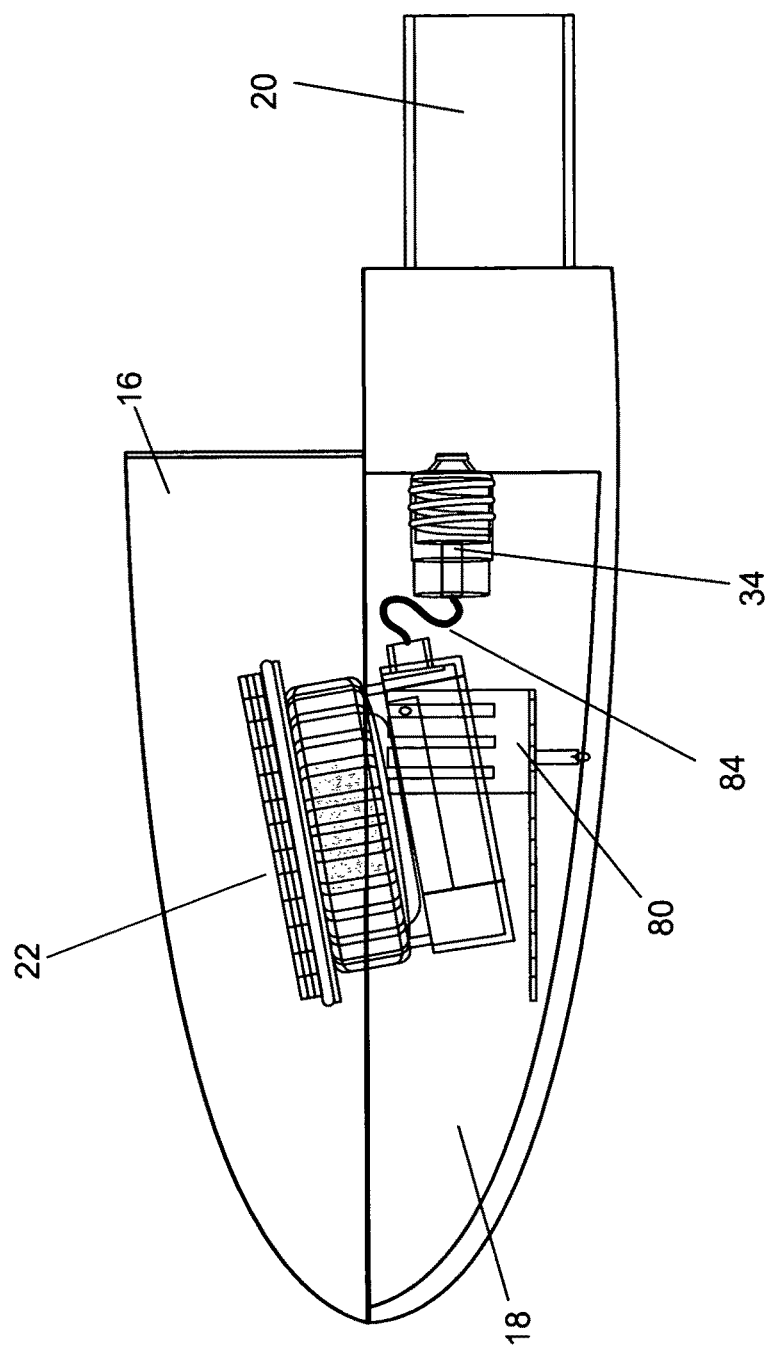

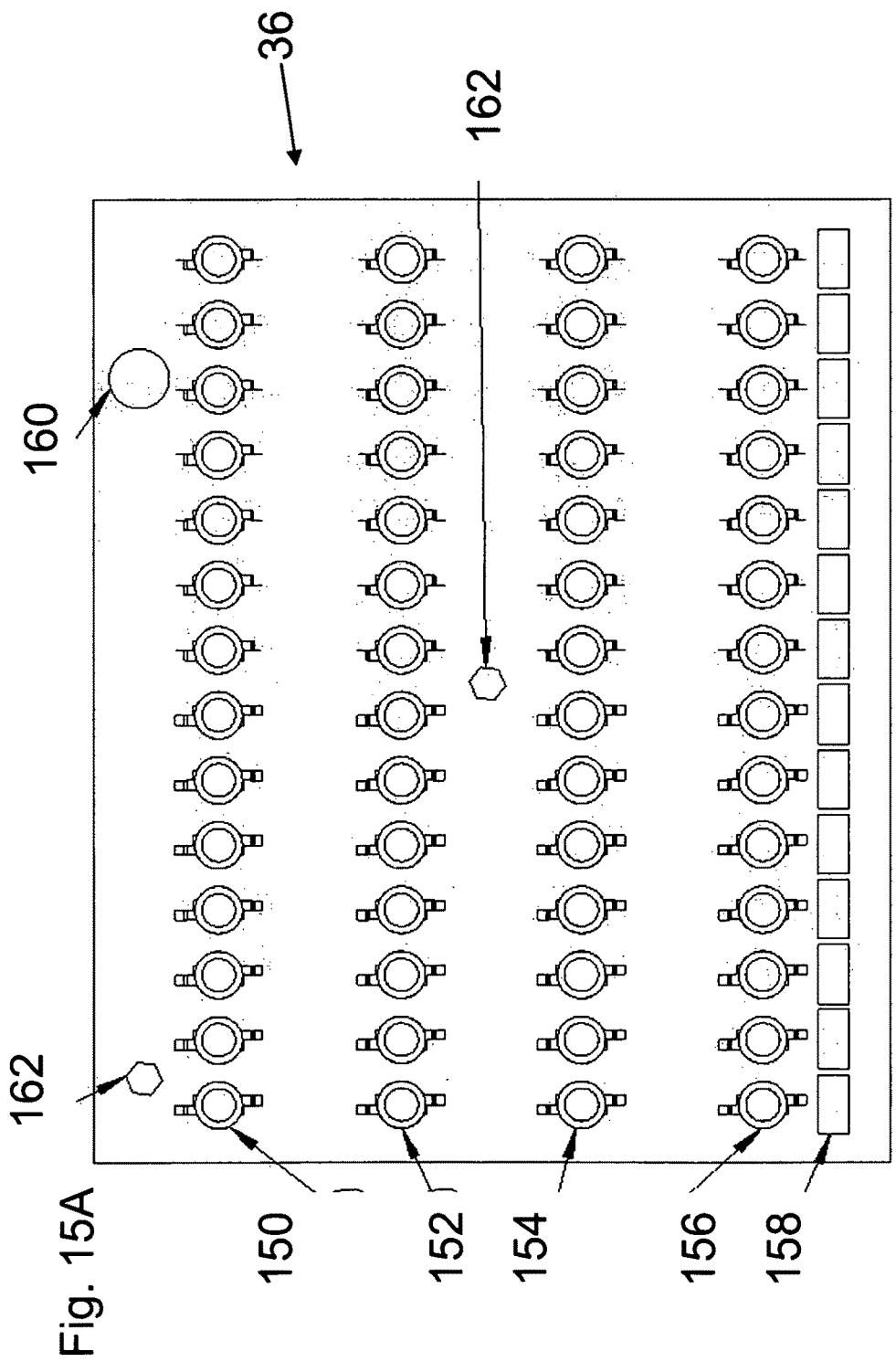

EFFICIENT ILLUMINATION SYSTEM FOR LEGACY STREET LIGHTING SYSTEMS

FIELD AND BACKGROUND OF THE INVENTION

The present invention relates to a device and method for lighting of streets, open and large spaces and, more particularly, but not exclusively to a way of inserting newer energy efficient lighting technologies into legacy street lighting systems.

Legacy street lighting systems are based on high pressure discharge lamps, most commonly high pressure sodium (HPS) lamps. These have been generally recognized to give the highest amount of lighting per watt of electricity used.

In some countries, notably the UK, low pressure sodium (LPS) lamps are still widely used.

When scotopic/photopic S/P light calculations are used, it can been seen how inappropriate high pressure sodium lamps are for night lighting. White light sources have been shown to double driver peripheral vision and increase driver brake reaction time at least 25%.

New street lighting technologies, such as Light Emitting Diode (LED) and Induction lighting, emit a white light that provides high levels of scotopic lumens allowing street lights with lower wattages and lower photopic lumens to replace existing street lights.

However, a disadvantage with LED is that a sufficient surface area to provide the required illumination means that the LED lamp cannot be retrofitted into legacy light fittings.

Specifically, the fittings for sodium lamps are screw fittings, requiring the lamp to be inserted into the fitting and then rotated. An LED lamp of the required brightness will generally fit into the space of the fitting but cannot then be rotated for insertion into the screw fitting. Furthermore the space is filled with the LED lamp and supporting electronics to such an extent that cooling is insufficient. In general about half of the energy supply to the LEDs ends up as heat, and the space within the light fitting simply does not allow for so much heat. In particular the light fittings are generally closed, if not sealed, against the weather. If sophisticated heat dispersion mechanisms are provided these reduce the lifetime of the LED lamp. Hence, replacement of traditional street lamps with LED lamps requires either supplying an LED lamp that is too small to provide the requisite illumination or the rather expensive changing of the light fittings.

SUMMARY OF THE INVENTION

The present embodiments provide for retrofitting of more modern energy efficient lamps such as LED into legacy light fittings.

According to one aspect of the present invention there is provided a lighting device comprising an LED lamp for fitting into a light fitting having a screw-in socket, useful for outdoor or large space lighting, the LED lamp comprising a plurality of light emitting diodes arranged over a surface of the lamp, the lamp being rotatably connected through a rotatable electrical connection to a screw-in adaptor for insertion into the screw-in socket, such that the screw in adaptor is rotatable independently of the lamp, the independent rotation of the screw-in adaptor thereby making an electrical connection through said socket even if the light fitting is insufficiently sized to allow rotation therein of the LED lamp.

In an embodiment, said rotatable connection to said screw in adaptor comprises an inner and outer concentric ring on a first side of said connection, the concentric rings having a gap therebetween, and a third concentric ring on a second side of said connection, said third concentric ring being slidable into said gap to be snapped into position between said first and second concentric rings.

In an embodiment, said lamp comprises a protection mechanism configured to
a) detect a failure of a light-emitting diode, and either one of:
b) provide rerouting of said connections around said failed light emitting diode, or
c) provide a voltage drop equivalent to said failed light emitting diode, thereby to maintain pre-existing voltage conditions at respective remaining diodes.

An embodiment may comprise a heat sink thermally coupled to said surface for providing cooling.

An embodiment may comprise a fan for driving cool air over said heat sink, said fan configured to draw said cool air from a first hole inserted in said closed fitting and to drive said air past said heat sink to a second hole inserted in said closed light fitting.

An embodiment may comprise a heat sink thermally coupled to said surface, the heat sink comprising a jet cooler for circulating air about fins of said heat sink, said jet cooler comprising a vibratable membrane for driving said circulation.

The lamp may be placed externally of a lighting cover.

The lamp may be built around a cover dimensioned for placing over an opening of said closed light fitting, the lamp being built such that said surface with said light emitting diodes is on a first side of said cover and said controlling electronics is on a second side of said cover, and said first side is placed to face outwardly of said closed light fitting.

The lamp may be built around a cover dimensioned for placing over an opening of said closed light fitting, the lamp being built such that said surface with said light emitting diodes is on an external side of said cover and said controlling electronics is connected on said external side with said light emitting diodes.

An embodiment may comprise a temperature detector and being configured with a control loop to maintain said light emitting diodes substantially at predefined operating temperatures over time.

The lamp may comprise a transceiver for a wireless or power-line connection for remote control and monitoring, or for data transfer.

An embodiment may allow remote controlling of an intensity level of said lamp.

An embodiment may be configured to receive input from a movement detector for detecting movement in a vicinity of said device, and wherein said lamp is controllable for setting to a relatively high illumination state when movement is detected in said vicinity and to a relatively low illumination state when movement is not detected in said vicinity.

An embodiment may be connected to other devices in a network, and configured to project detected movements such that individual device are switched on and off to provide advance light paths to detected pedestrians or vehicles.

An embodiment may comprise a camera mounted with said lamp, and connected to receive power via said screw-in adaptor.

According to a second aspect of the present invention there is provided a LED lamp comprising a plurality of light emitting diodes arranged over a surface and connected together via connections, and a protection mechanism configured to
a) detect a failure of a light-emitting diode, and
b) provide rerouting of said connections around said failed light emitting diode, or c) provide a voltage drop equivalent to said failed light emitting diode, thereby to maintain pre-existing voltage conditions at respective remaining diodes.

An embodiment may comprise a heat sink thermally coupled to said surface for cooling.

An embodiment may comprise a fan for driving cool air over said heat sink, said fan configured to draw said cool air from a first hole inserted in said closed fitting and to drive said air past said heat sink to a second hole inserted in said closed light fitting.

The lamp may be built around a cover dimensioned for placing over an opening of said closed light fitting, the lamp being built such that said surface with said light emitting diodes is on a first side of said cover and said controlling electronics is on a second side of said cover, and said first side is placed to face outwardly of said closed light fitting.

The lamp may be built around a cover dimensioned for placing over an opening of said closed light fitting, the lamp being built such that said surface with said light emitting diodes is on an external side of said cover together with said controlling electronics.

An embodiment may comprise a temperature detector and a control loop to maintain said light emitting diodes substantially at predefined operating temperatures over time.

A lamp may comprise a transceiver for a wireless or powerline connection for remote control and monitoring.

An embodiment may comprise a camera configured for transmitting images over said wireless connection using said transceiver.

According to a third aspect of the present invention there is provided a LED lamp for fitting into a closed light fitting, the LED lamp comprising a plurality of light emitting diodes over a surface, a heat sink thermally coupled to said surface and a fan for driving cool air over said heat sink, said fan configured to draw said cool air from a first hole inserted in said closed fitting and to drive said air past said heat sink to a second hole inserted in said closed light fitting.

An embodiment may comprise a transceiver for a wireless or powerline connection for remote control and monitoring, said lamp further comprising a camera, configured to transmit images using said wireless connection.

According to a fourth aspect of the present invention there is provided an LED lamp with controlling electronics, for fitting into a closed light fitting, the LED lamp comprising a plurality of light emitting diodes over a surface, the lamp being built around a cover dimensioned for placing over an opening of said closed light fitting, the lamp being built such that said surface with said light emitting diodes is on a first side of said cover and said controlling electronics is on a second side of said cover, and said first side is placed to face outwardly of said closed light fitting, said lamp further comprising a transceiver for a wireless connection for remote control and monitoring, said lamp further comprising a camera, configured to transmit images using said wireless connection.

According to a fifth aspect of the present invention there is provided a system for combined street-lighting and surveillance, comprising a plurality of outdoor lighting installations, each outdoor lighting installation comprising an LED lamp, the lamp being rotatably connected through a rotatable electrical connection to a screw-in adaptor for insertion into a screw-in socket of a respective installation, and at least some of said street lamps further comprising a camera, said cameras being connected to receive power via respective screw-in adaptors.

The streetlamps may be networked together for communication, said networking providing control for said street lamps and said cameras and for transmitting images from said cameras to a controller.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. This refers in particular to tasks involving the control of the spectral equipment.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 8A is a simplified diagram showing a third embodiment of the present embodiments in which a flexible mounting holds the LED lamp;

FIG. 15A is a simplified diagram of a circuit board with LEDs arranged in a matrix and provided with temperature and lighting sensors and circuit protection, for use in lamps according to embodiments of the present invention;

DESCRIPTION OF THE PREFERRED EMBODIMENTS

Figure 1:
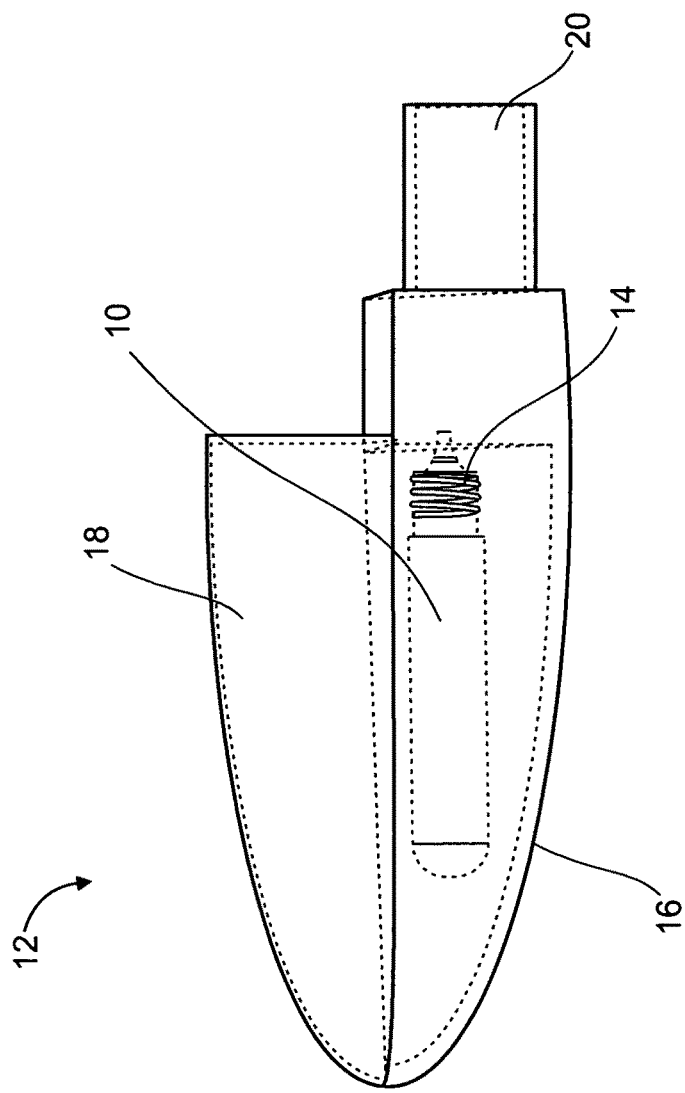
FIG. 1 is a simplified diagram of a legacy light fitting of the prior art.

The present embodiments comprise an LED lamp fitting that may be simply inserted into a legacy light fitting and screwed into electrical contact. The present embodiments further comprise a lamp that may be cooled within the confines of the space available within the legacy light fittings. The present embodiments also comprise a control system for the street lighting system and a bypass circuit for failed LEDs within the lamp.

More particularly, the present embodiments provide an LED lamp for outdoor and large space lighting, particularly for streets, warehouses car parks and the like, which is adapted for fitting into legacy light fittings such as those designed for sodium lamps and the like. The LED lamp comprises a plurality of light emitting diodes arranged over a surface of the lamp. The lamp is rotatably connected through a rotatable electrical connection to a screw-in adaptor for insertion into a legacy screw-in socket, such that the screw in adaptor is rotatable independently of the lamp. Thus the legacy screw-in socket can be used even though the light fitting is too small to allow rotation of the LED lamp itself.

Additional embodiments provide for cooling airflow through the light fitting, for temperature control of the LEDs, and for failure protection, to ensure a longest possible lamp lifetime.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1 which illustrates a prior art sodium lamp 10 located within a light fitting 12. The bulb 10 fits mechanically and electrically by insertion of screw 14 into a correspondingly shaped socket. A reflector 16 defines the upper part of the fitting 12, and a transparent cover 18 defines the lower part of the fitting. A stem 20 allows the fitting to be fixed to a lamp post, not shown.

The light fitting of FIG. 1 cannot conventionally be used for an LED lamp because the surface area of LEDs needed to provide an equivalent amount of illumination to the sodium lamp, is too large to rotate within the fitting. Thus the screw-in socket cannot be used. Furthermore, LEDs only work efficiently if they are close to their design temperatures, and the housing of the light fitting does not provide enough room for cooling of the relatively large LED lamp.

A further issue, applicable not just to the legacy housing, is that the LED lamps comprise a large number of diodes, each one separately subject to failure. A failure in one LED causes loss of current to any other LED connected in series and leads to an increase in current to each LED connected in parallel. Thus the LEDs connected in series cease to provide their illumination, and the remaining LEDs operate outside their design specifications, thus shortening lifetime.

Figure 2:
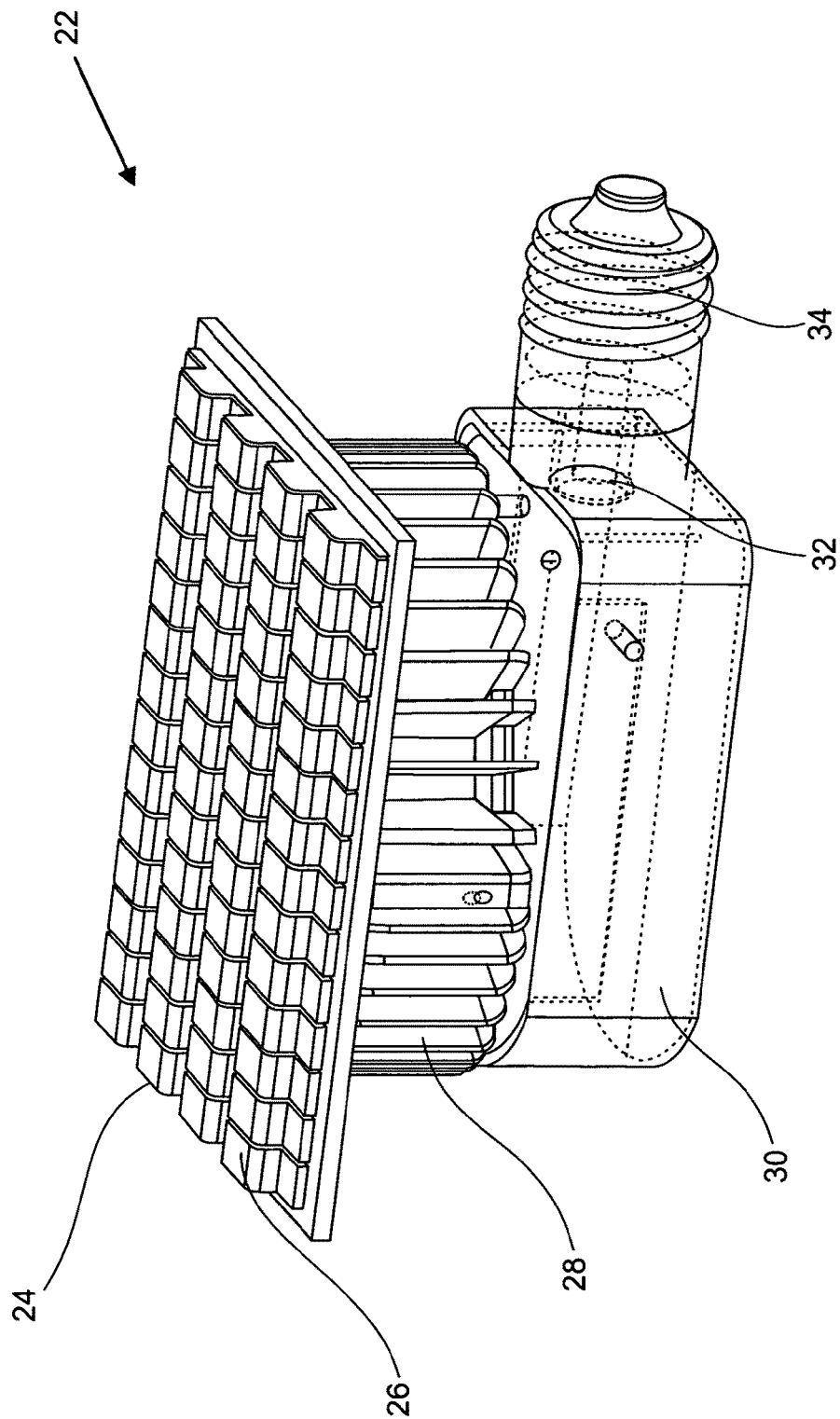
FIG. 2 shows an LED street lamp according to a first embodiment of the present invention.

Reference is now made to FIG. 2, which illustrates an LED lamp 22 according to a first embodiment of the present invention. Four rows of LEDs, typically white LEDs, are fixed in a circuit under a lens plate 24. The lens plate 24 includes lenses for each LED in protrusions 26 to ensure appropriate direction of the light about the space being illuminated. A heat sink 28 is fixed below a metal circuit board (MPCB) carrying the LEDs and in thermal contact therewith, for example through a layer of heat conducting paste. The heat sink 28 serves to remove heat from the LEDs, necessary since the LEDs work most efficiently within a certain temperature range, and failure to remove heat may therefore lead to reduced efficiency.

Electronic box 30 contains control electronics for the LED lamp 22, and for a communication unit if provided, as will be discussed in greater detail below.

A snap-in rotary connection 32 attaches screw in plug 34. Screw adaptor 34 is rotatable independently of the rest of the lamp 22. Thus lamp 22 can be fitted into light fitting 12, and screw adaptor 34 can be rotated to screw in to a screw socket without needing to rotate the lamp 22 itself. Hence lamp 22 can be fitted into legacy light fittings intended for a sodium bulb 10.

Figure 3:
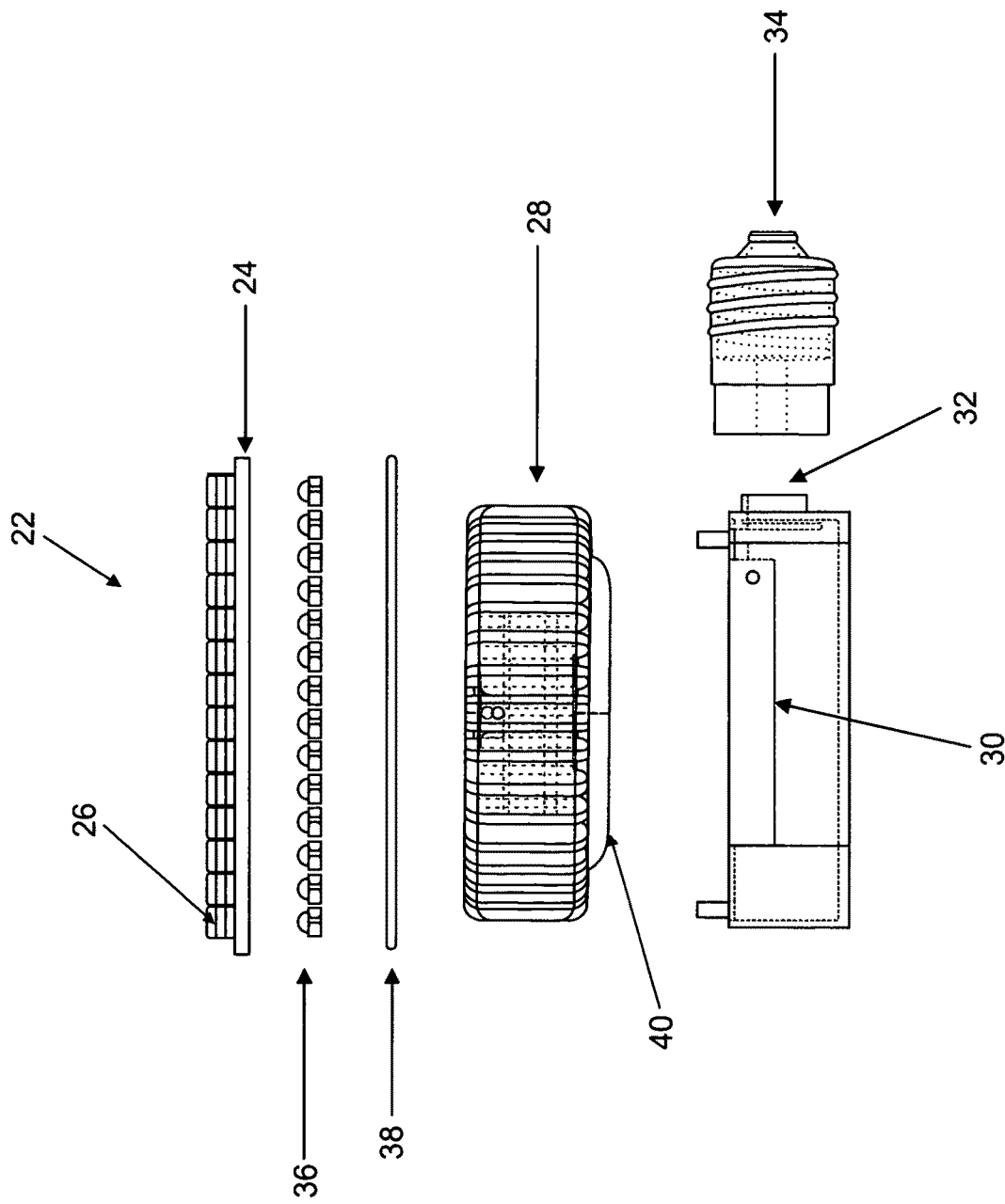
FIG. 3 is an exploded diagram of the lamp of FIG. 2.

Reference is now made to FIG. 3, which is an exploded diagram of lamp 22, showing its structure in greater detail. Parts that are the same as in FIG. 2 are given the same reference numerals and are not described again except as necessary for understanding the present figure.

LEDs 36 are assembled on the MPCB 38 under lens plate 24. The lens plate 24 includes lenses for each LED in lenses 26 to ensure appropriate direction and pattern of the light about the space being illuminated. A heat sink 28 is fixed below the circuit board carrying the LEDs and in thermal contact therewith through MPCB layer 38 and heat conducting paste. The heat sink 28 serves to remove heat from the LEDs, for example under the influence of a jet cooler 40 as discussed hereinbelow. Electronic box 30 contains control and optionally, communications, electronics for the LED lamp 22, as will be discussed in greater detail below. Screw adaptor 34 is connected via snap in connection 32. Snap in connection holds the adaptor firmly and allows for an electrical connection, but leaves the adaptor free to rotate.

Figure 4:
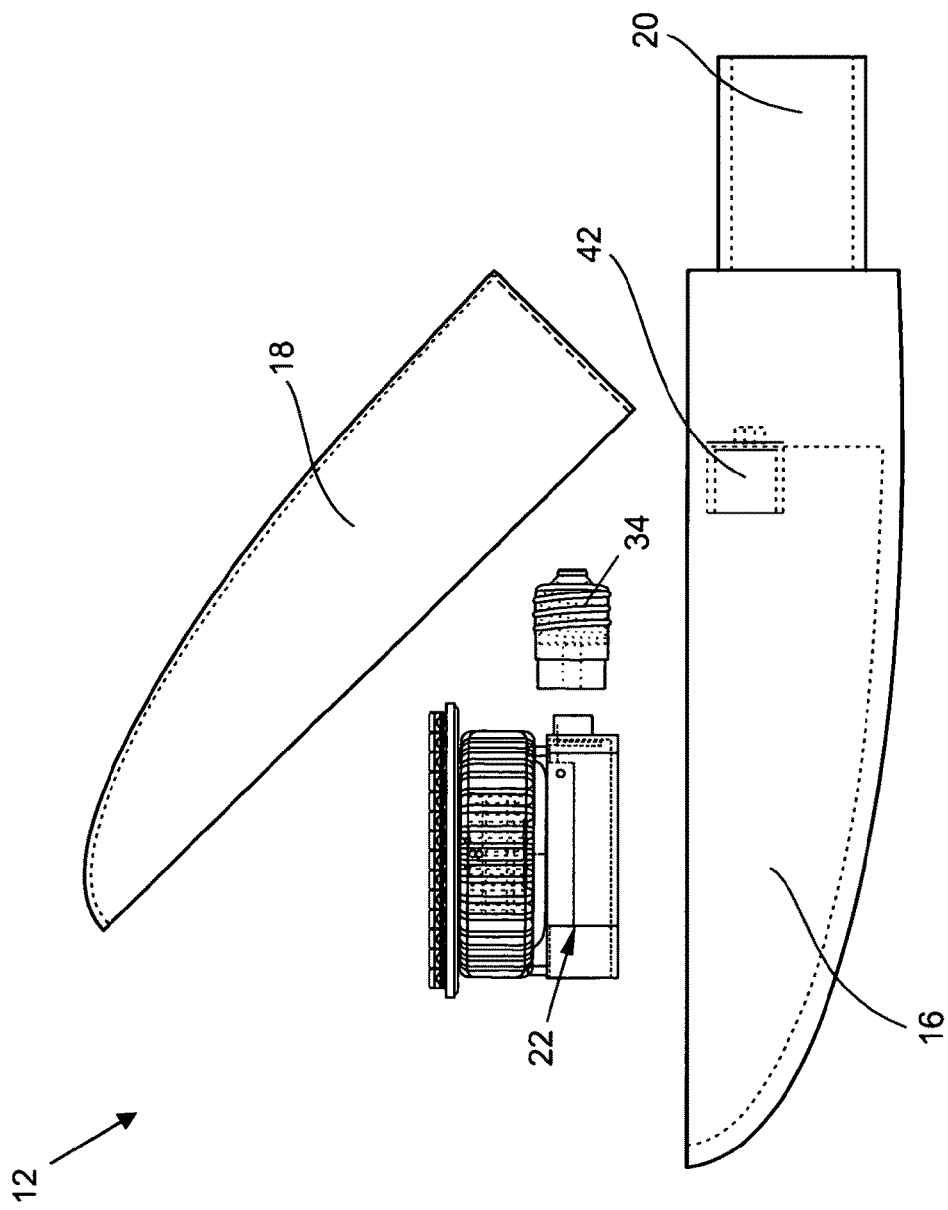
FIG. 4 is a simplified diagram showing schematically how the lamp of FIG. 2 is inserted into the legacy light fitting of FIG. 1.

Reference is now made to FIG. 4 which shows how LED lamp 22 may be inserted into light fitting 12. Lamp 22 is small enough to fit into the fitting but too large to rotate. The lamp 22 is inserted inside transparent cover 18 over fitting body 16, which no longer requires a reflector. The reason that a reflector is no longer required is that LEDs are directional. Screw in socket 42 receives the screw adaptor 34.

Figure 5:
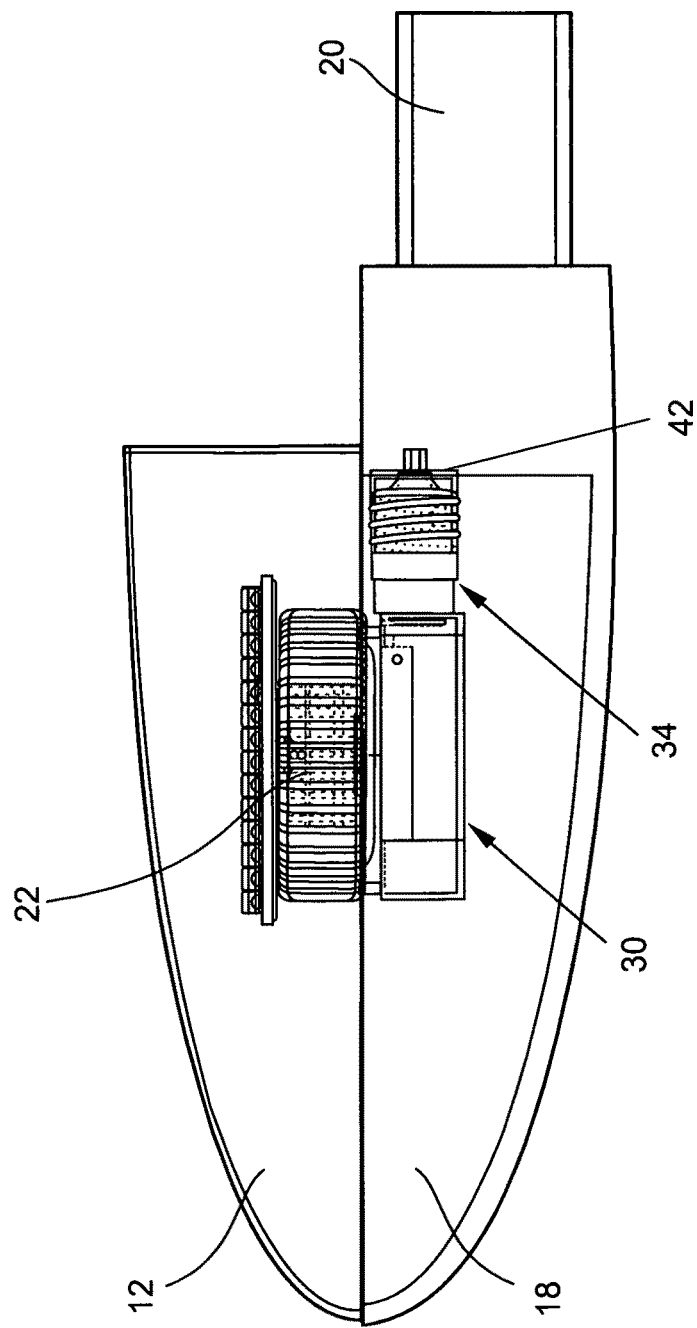
FIG. 5 is a simplified diagram showing schematically the lamp of FIG. 2 following insertion into the legacy light fitting of FIG. 1.

FIG. 5 is a schematic cross sectional view from the side, illustrating the LED lamp 22 in situ within legacy fitting 12.

Figure 6:
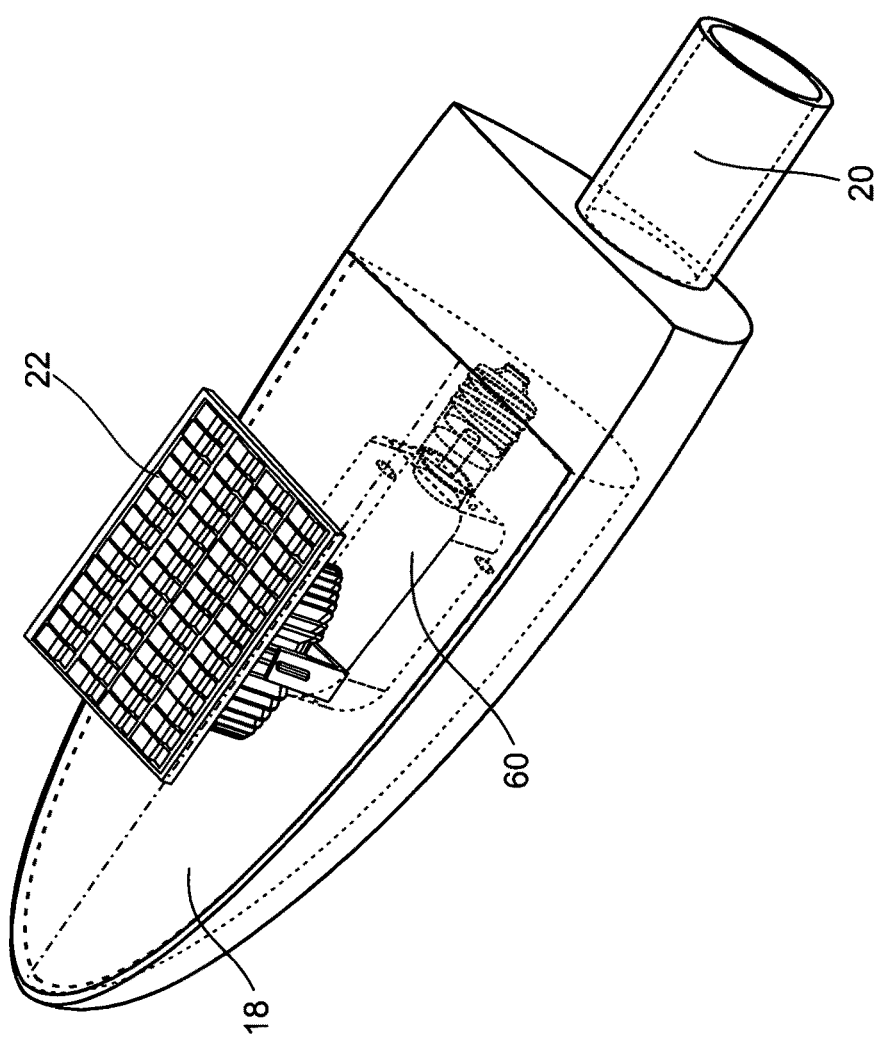
FIG. 6 is a simplified diagram illustrating an embodiment in which the LEDs and heatsink are external to the light fitting.
Figure 7A:
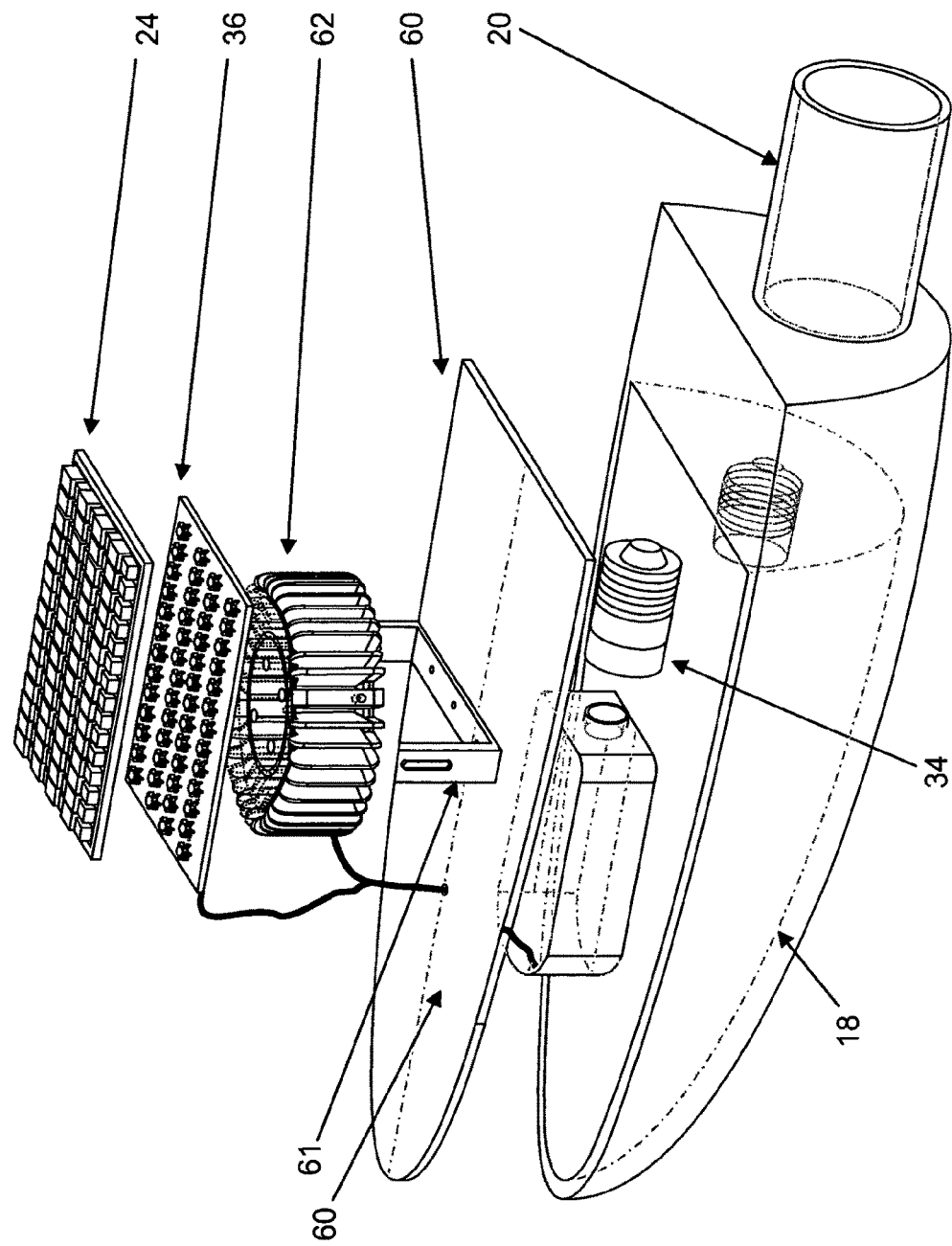
FIG. 7A is a simplified exploded diagram of the embodiment of FIG. 6.

Reference is now made to FIGS. 6 and 7A, which are views from below and an exploded diagram respectively of a variation of the embodiment of FIG. 2. In the variation, the lamp 22 and heatsink are mounted outside the fitting body 18 using a mounting cover 60. The mounting cover 60 fits in between the LEDs and the electronics box 30 which is mounted on mounting bracket 61. As shown in FIG. 7A, the mounting cover is located between the electronics box 30 and the heat sink, the heat sink is here shown replaced by a jet cooler 62 which is mounted so as to allow angular adjustment. A jet cooler provides active cooling using artificial jets of turbulent air which are set up by a vibrating membrane, as will be discussed in greater detail below.

The placement of the LEDs externally to the lamp solves the problem of cooling, since the warmed air is released to the atmosphere, in contrast to the internal case, where the warmed air is confined to the vicinity of the LEDs.

Figure 7B:
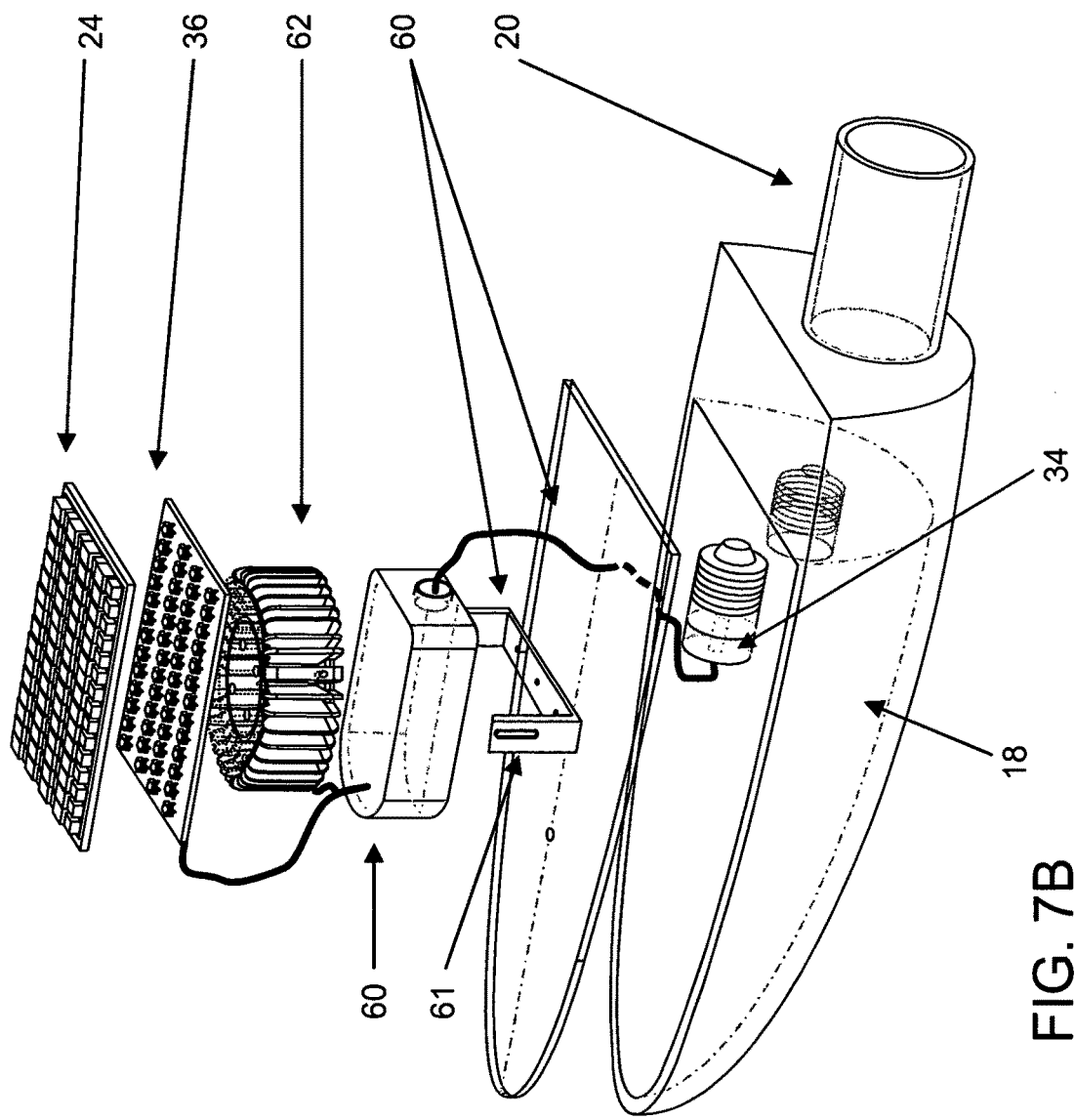
FIG. 7B is a simplified exploded diagram of a variation of FIG. 7A in which the electronics as well as the LEDs are mounted externally to the light fitting.

FIG. 7B shows a further variation in which the electronics box is also located externally of the light fitting. This further reduces heating issues within the enclosed space of the light fitting.

Reference is now made to FIG. 8A, which is a simplified cross section from the side showing the LED lamp 22 in an adjustable mount 80. Screw in adaptor 34 fits into the socket in the same way as with previous embodiments and is connected via power cable 84 to the electronics attached to adjustable mount 80. The lamp body 18 may include a reflector and the mounting allows the LED lamp 22 to be pivotally inserted so that the lamp can be angled to provide appropriately directed illumination.

Figure 8B:
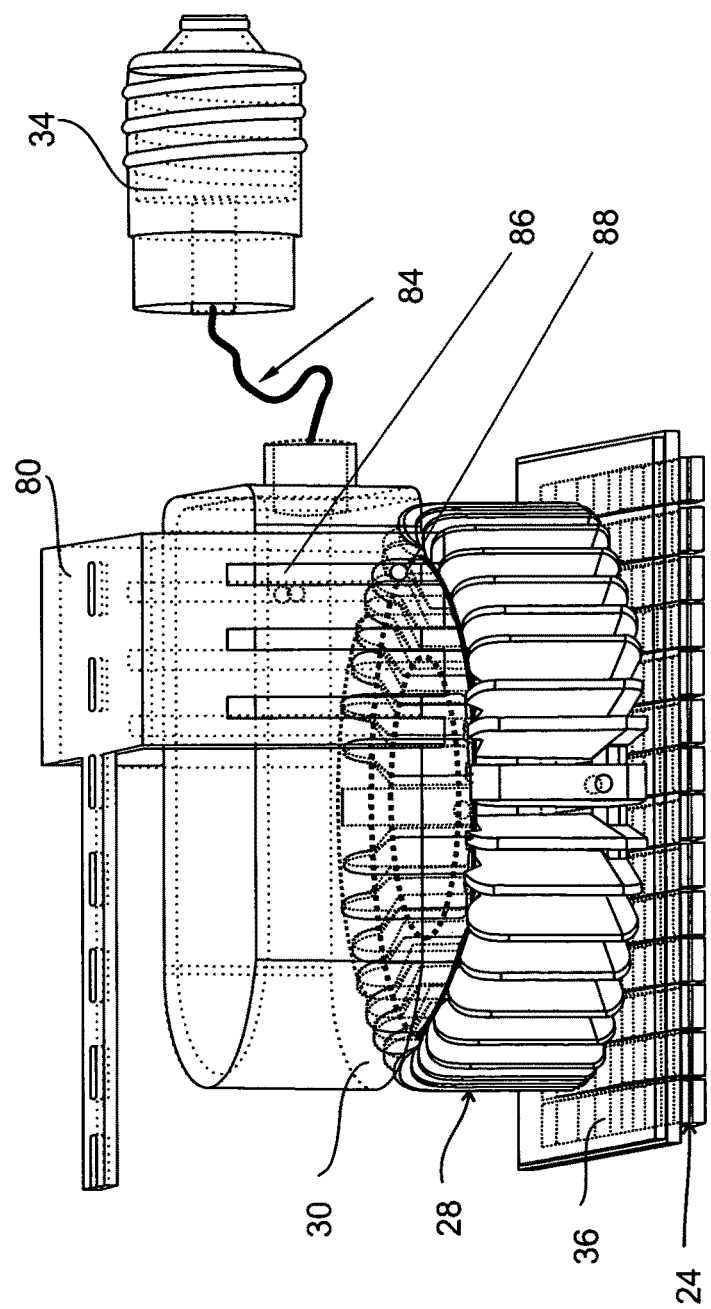
FIG. 8B shows details of the mounting of FIG. 8A.

FIG. 8b shows the pivot mechanism in greater detail. Adjustable mount 80 contains slots 86, into one of which protrusion 88 of electronic box 30 is inserted. The protrusion allows the LED lamp to be angled. The length may also be adjusted by selecting one of three available slots with which to position the lamp.

In some cases a heat sink alone is not sufficient to keep the LEDs cool. There are two issues with cooling. The first is to cool the LEDs themselves and the second is to remove the warmed air from the light fitting.

Figure 9:
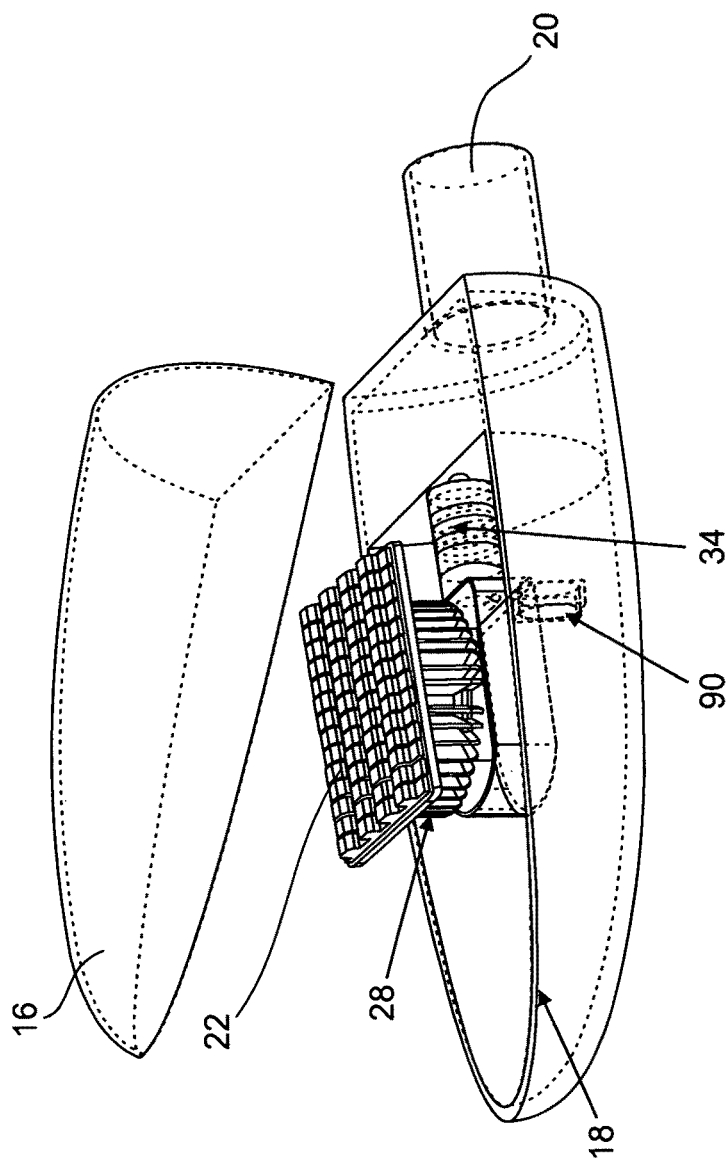
FIG. 9 is a schematic diagram illustrating an LED lamp according to the present embodiments placed within a legacy light fitting, having a jet cooler for cooling the LEDs and a fan for removal of the heated air.

Reference is now made to FIG. 9, which illustrates an embodiment in which a jet cooler is thermally coupled to the LED lamp circuit. As will be discussed below, the jet cooler is a heat sink which sets up its own vibrations around it and thus produces air flow of its own, the jets, to cool its own fins. A fan 90 then removes the warmed air of the jets from the light fitting. The jet cooler removes a smaller amount of air than a conventional fan but the amount is sufficient for cooling LEDs. Thus the jet cooler solution is particularly efficient.

Figure 10:
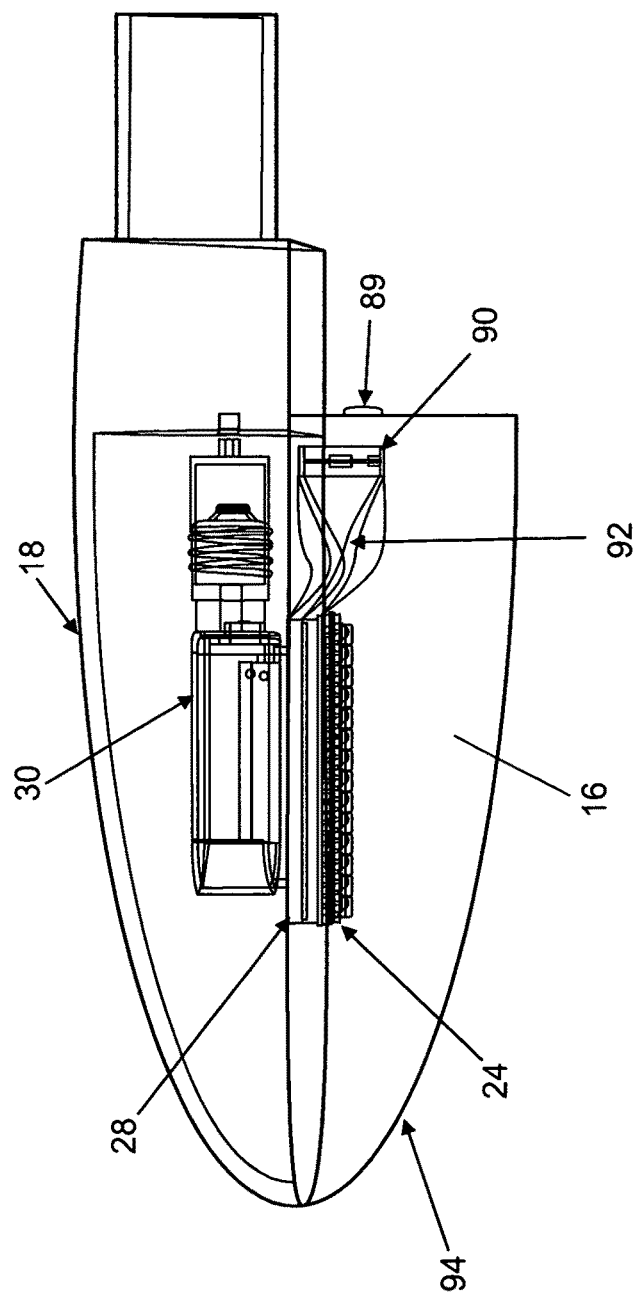
FIG. 10 is a cross sectional view of an embodiment of the present invention which cools the LEDs and removes the resulting heated air using a fan.

FIG. 10 is a cross section, showing an alternative fan embodiment in greater detail in situ within an adapted fitting. The jet cooler is replaced by a standard heat sink and fan. An external filtered hole 89 allows air in to the installation. Fan 90 rotates and cold air director 92 directs air from the fan to the heat sink. A filtered outlet 94 allows hot air to exit the installation. The embodiment thus sets up a cooling airflow through the light fitting that takes warmed air from the heat sink and expels it to the outside.

Figure 11:
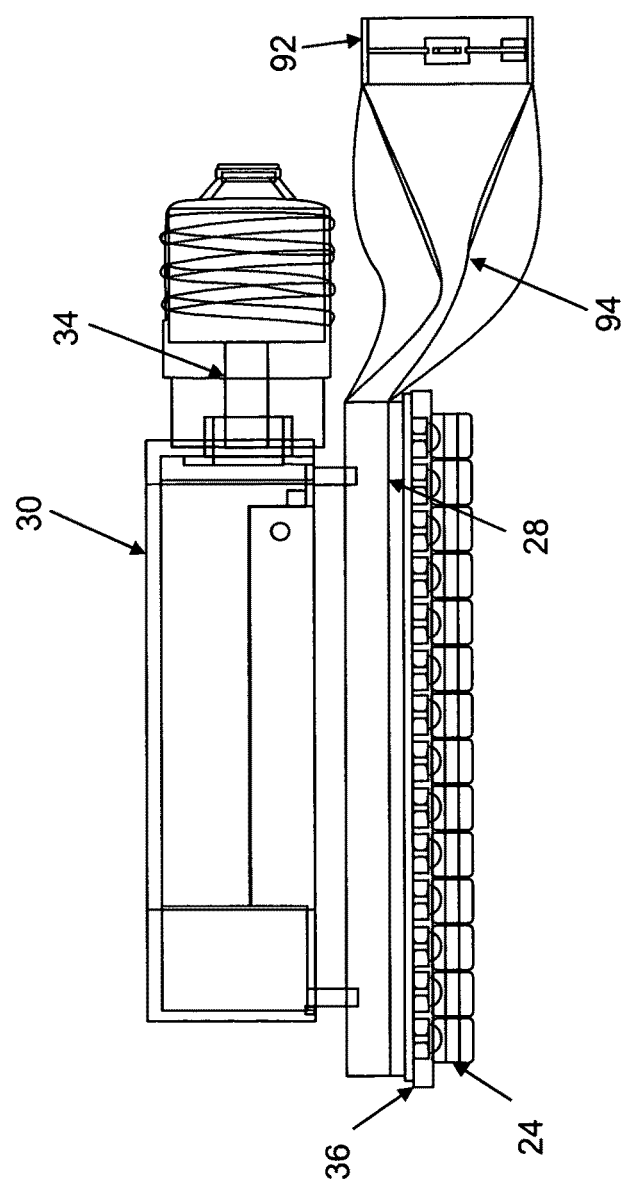
FIG. 11 illustrates the lamp of FIG. 10 mounted with a fan but not showing the light fitting.
Figure 12:
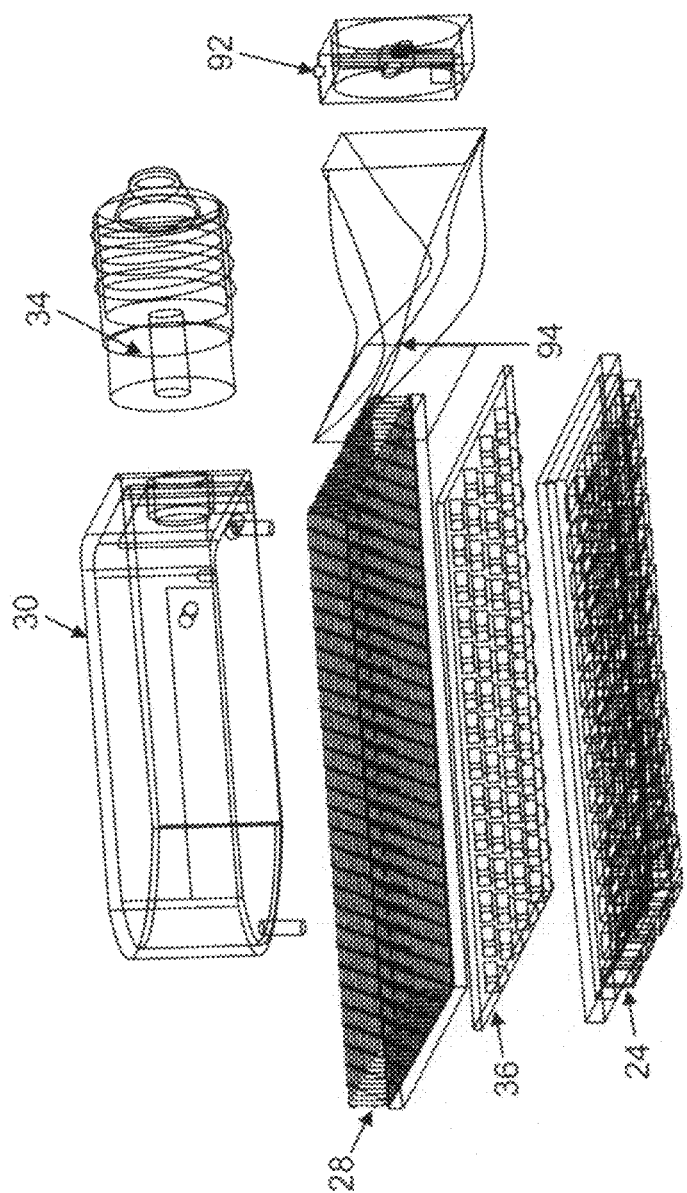
FIG. 12 is an exploded view of the lamp of FIG. 11.

FIG. 11 shows the lamp of FIG. 10 with the fan but without the fitting. FIG. 12 is an exploded view of FIG. 11.

Figure 13A:
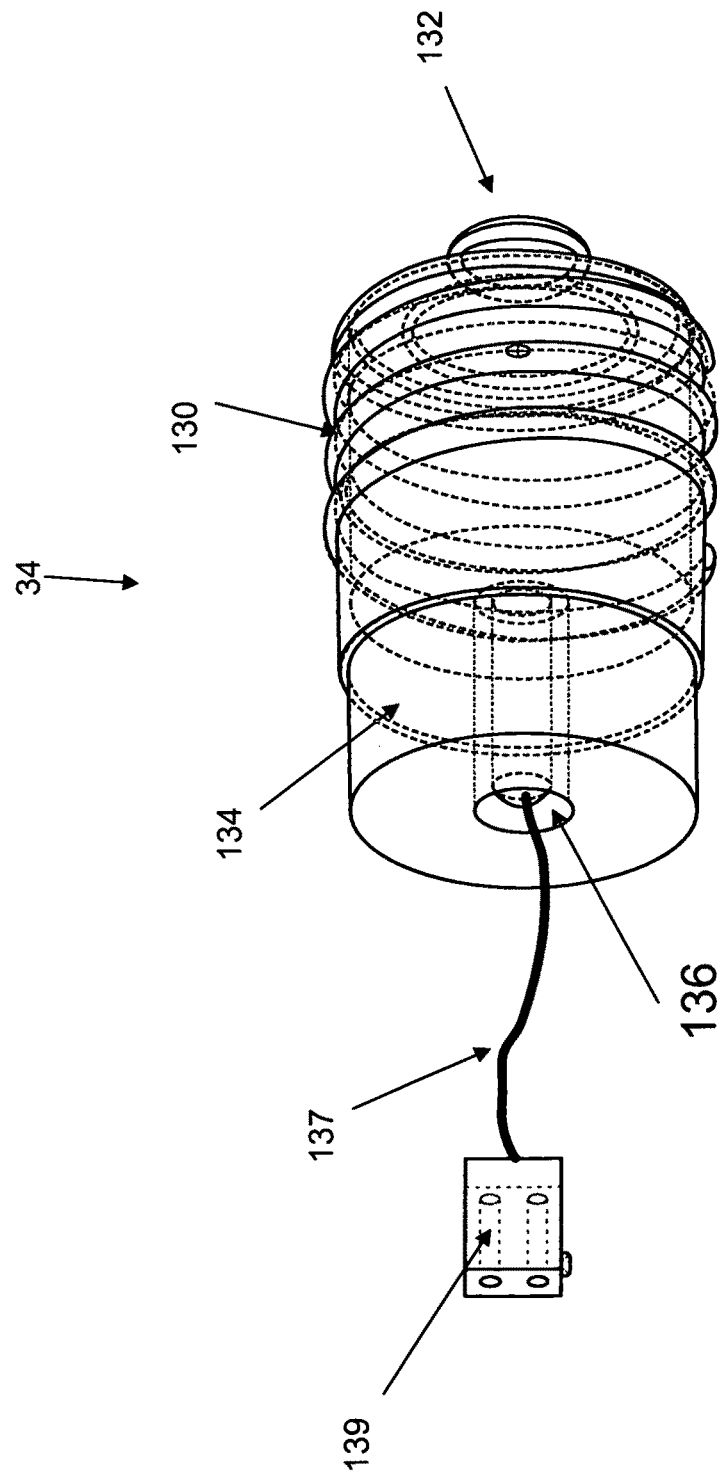
FIG. 13A is a view of the rotatable screw-in adaptor according to one embodiment.

FIG. 13A is a schematic diagram of adaptor 34. The adaptor comprises a screw part 130 which is threaded and comprises a null contact for insertion and fixing into the screw socket of the light fitting. A live contact 132 is at the center of the screw part 130 and is pressed into contact with the socket when the screw part 130 is tightened into the socket. A ring part 134 fits under the screw part and is slidable therewith. An internal bore 136 extends the length of the ring part 134 and allows a cable to pass between live connector 132, and null connecter 130. Corresponding connector 139 is snap connected to the lamp. In use the screw in adaptor is screwed into the screw socket by rotation. The rotation does not require rotation of the lamp. The connection to the lamp is made via connector 38 which does not rotate.

In addition a mechanical holder may be added to support the lamp mechanically, or the socket 139 may be insertable into the adaptor 34 to provide mechanical support.

Figure 13B:
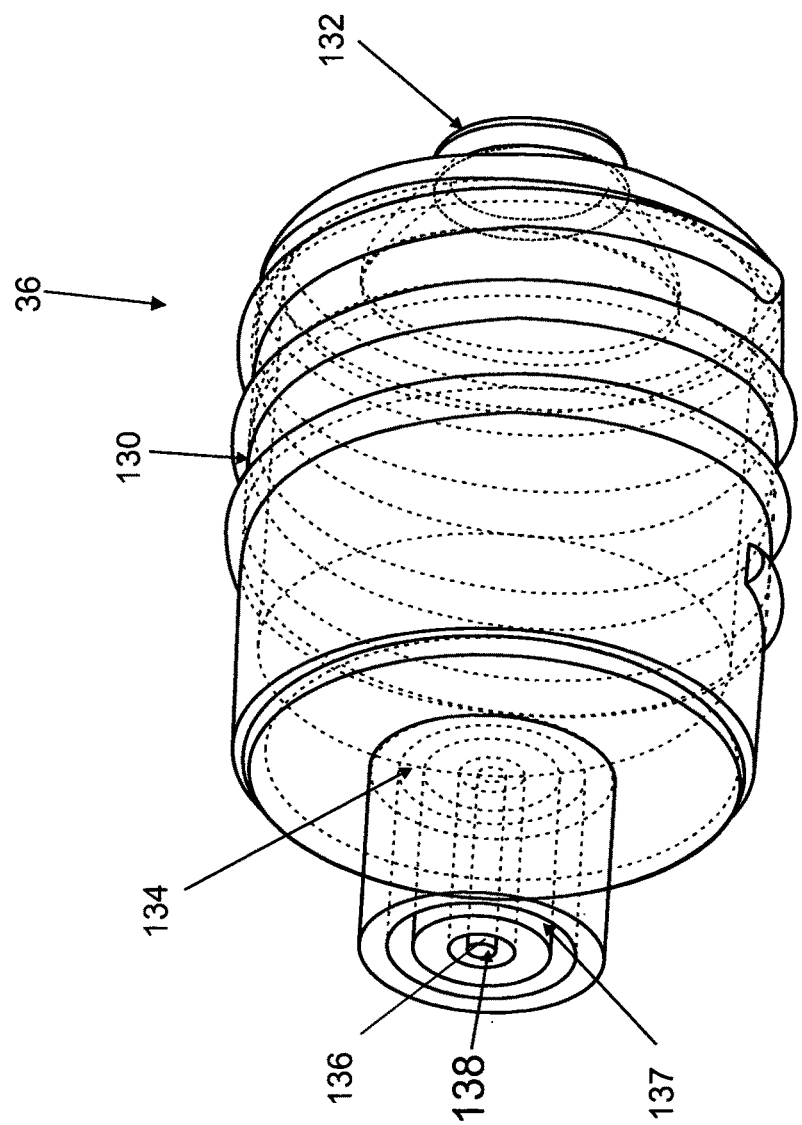
FIG. 13B is a view of the rotatable screw-in adaptor according to a second embodiment and showing details of the rotatable connection.

FIG. 13B is a variation of the adaptor showing a mechanism for clipping the adaptor 36 rotatably to the lamp. Electrical connection 136 is surrounded by outer ring parts 134 which serve as a clip, and inner concentric ring 137 for sliding over, with gap 138 defined therebetween. A circular rim of the lamp is snapped into the gap between concentric rings 134 and 137. Ring 134 provides a snap connection for the inserted rim and allowing the adapter to slide without rotating the lamp. There are two ways in which the connector of FIG. 13B may be used. A first option is to screw the adaptor 36 into the screw socket and after that press connect the lamp into the adaptor. A second option is for the adaptor to be connected to the lamp and then rotated into the screw socket. In this case the adaptor slides at the lamp connection, so that the lamp itself is not rotated.

Figure 14:
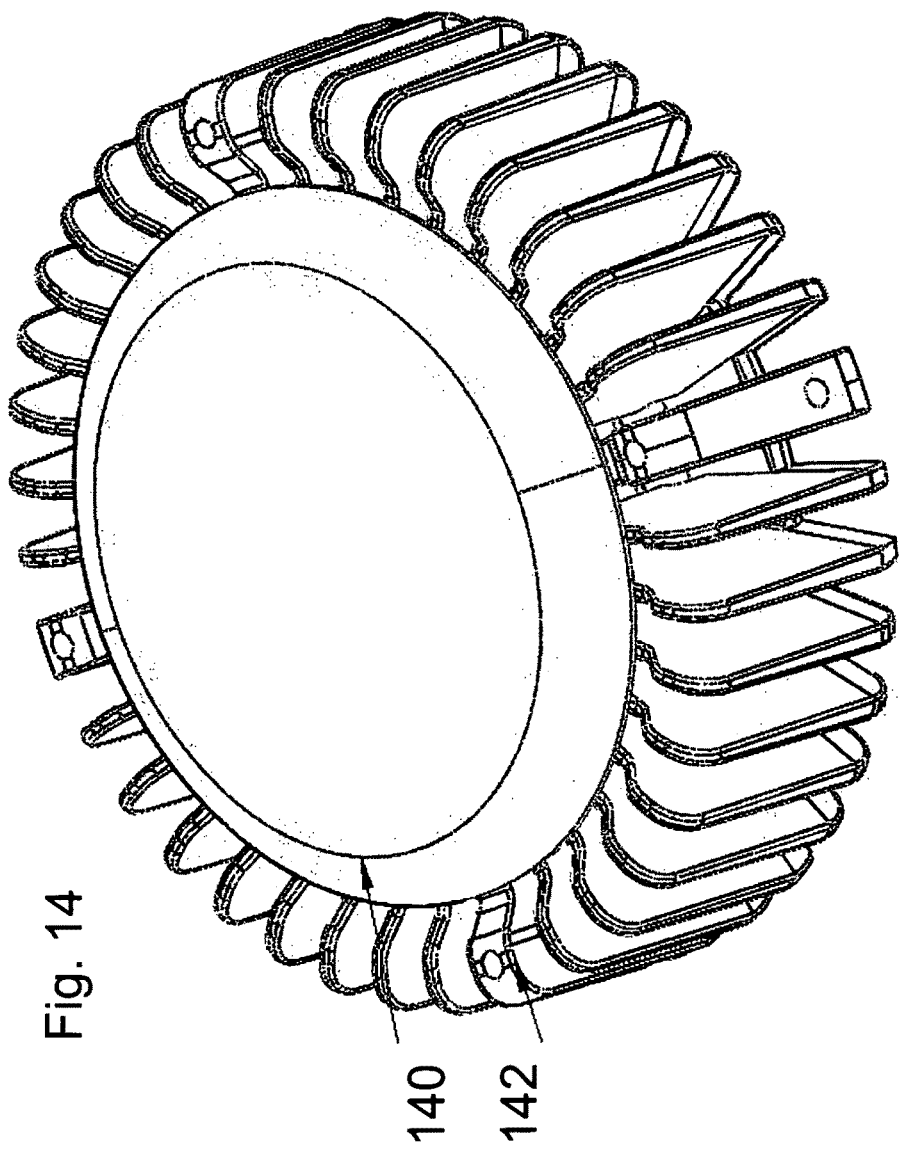
FIG. 14 is a simplified diagram illustrating a jet cooler for use in embodiments of the present invention.

FIG. 14 shows the jet cooler 62 in greater detail. The jet cooler comprises a membrane and control part 140 and a heat sink part 142. The membrane vibrates and sets up unstable air currents at the fins which remove hot air from its vicinity. In general the air movement is slow, but this is sufficient for an LED lamp.

Reference is now made to FIG. 15A which shows the printed circuit board 36 with LEDs. The LEDs are arranged in four rows 150, 152, 154 and 156. Protectors 158 provide circuit protection for their respective columns of LEDs. The LEDs may be serially connected over a column with the columns connected in parallel or any other suitable arrangement of series and parallel connections may be used. In any event, a failure in one LED may lead to switching off of other LEDs in series and thus cause an increase in current/voltage for the parallel LEDs. The increase in current/voltage leads to the LED being taken away from its optimal operating conditions and thus leads to shortened lamp life.

The circuit protector detects failure of an individual LED and may insert itself into the connection, taking the voltage drop of one LED. The series connection of the failed LED is thus maintained, and the design voltage continues to be applied to the other LEDs as if nothing has happened. Thus it ensures that the rest of the lamp not only continues operating, but does so under the design voltage and current conditions. Thus lamp lifetime is prolonged at the cost of 2-5% loss of voltage A light sensor 160 is provided and a temperature sensor 162. Both the light sensor and the temperature sensor are used in a control loop algorithm, to keep the LEDs operating at their optimum temperature and thus increase the lifetime of the lamp. Both LED and surrounding temperatures are preferably measured, and light levels are varied to change the temperature as necessary, as will be explained below.

Figure 15B:
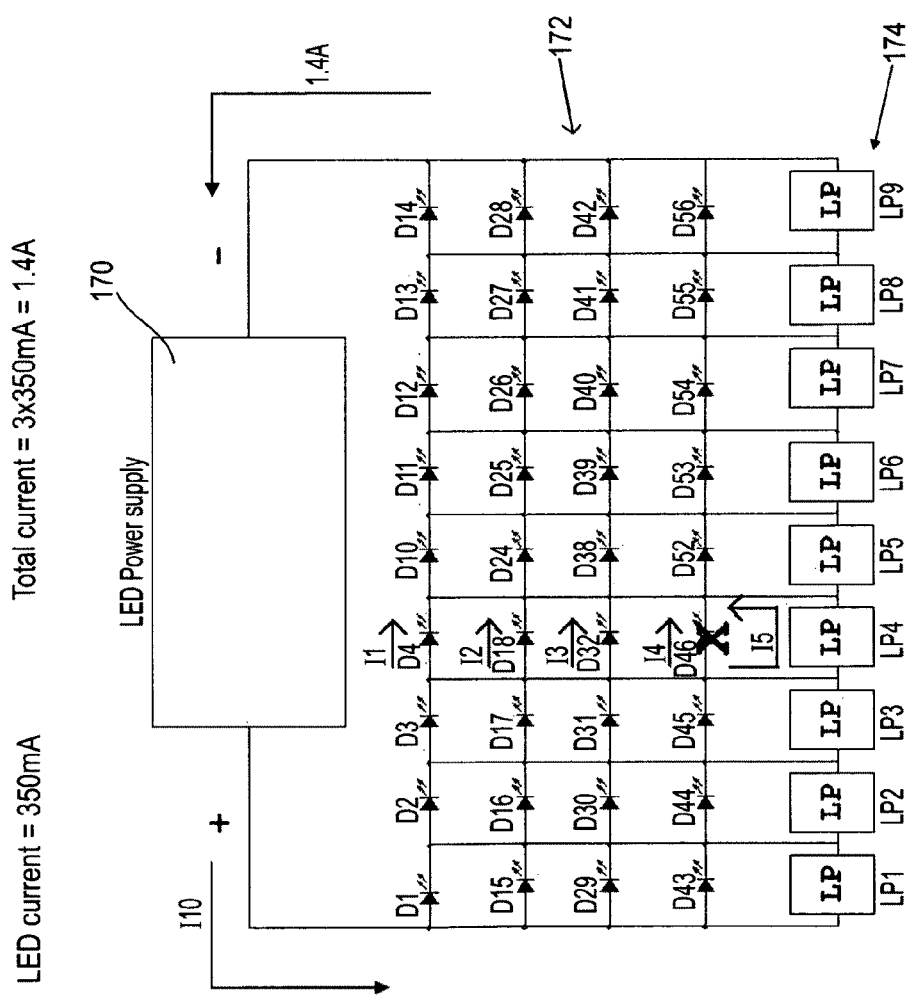
FIG. 15B is a simplified circuit diagram of LEDs and circuit protection in a matrix layout on a printed circuit board.

Reference is now made to FIG. 15B, which is a simplified circuit diagram of LEDs and circuit protection in a matrix layout on a printed circuit board. LEDs have a current rating and require the rated current in order to work at their most efficient. Thus a constant current power supply 170 provides the correct current to matrix 172 of LEDs, provided that the number of LEDs and the circuit geometry remain unchanged. In order to ensure that the number of LEDs and the circuit geometry remain unchanged even in the event of failure of one or two LEDs, fault controllers 174 are provided at the end of each column, as explained. The power supply 170 merely sees a row of LEDs and does not see the current supplied to an individual LED.

Thus for example current I10, split equally between four rows as I1 . . . I4, provides 350 mA each. Now, if LED D46 fails, then the current I10 flows only in three rows, giving a new current of 466.67 mA for each row. The new current is far above the ratings for the remaining LEDs and may lead to early failure.

The circuit protection remedies the situation by monitoring the voltage drop at each parallel branch, and enter operation whenever the voltage drop rises above the expected level. This is effective because as soon as one row fails, the current increases in the other rows, leading to a larger voltage drop.

There are three possibilities for suitable voltage protection. A first is to operate the circuit protector to override the entire column in which the failure occurred, in this case, D4, D18 and D32. This rebalances the branches, thus restoring the four-way splitting of the available current, but at the cost of a small number of LEDs not being operated even though they are in good condition.

A second option is to connect a load that is the same as the LED in parallel with the failed LED. The connection is shown as the I5 bypass current. Again this leads to identical branches and thus the four way splitting of the current. The resistance varies relative to the voltage over the branch, allowing the circuit protector to provide different levels of load for other numbers of LED failures.

A third option is a mixture of the two approaches. If one LED fails then a parallel load is added. If more than one LED fails then the column is bypassed.

Figure 15C:
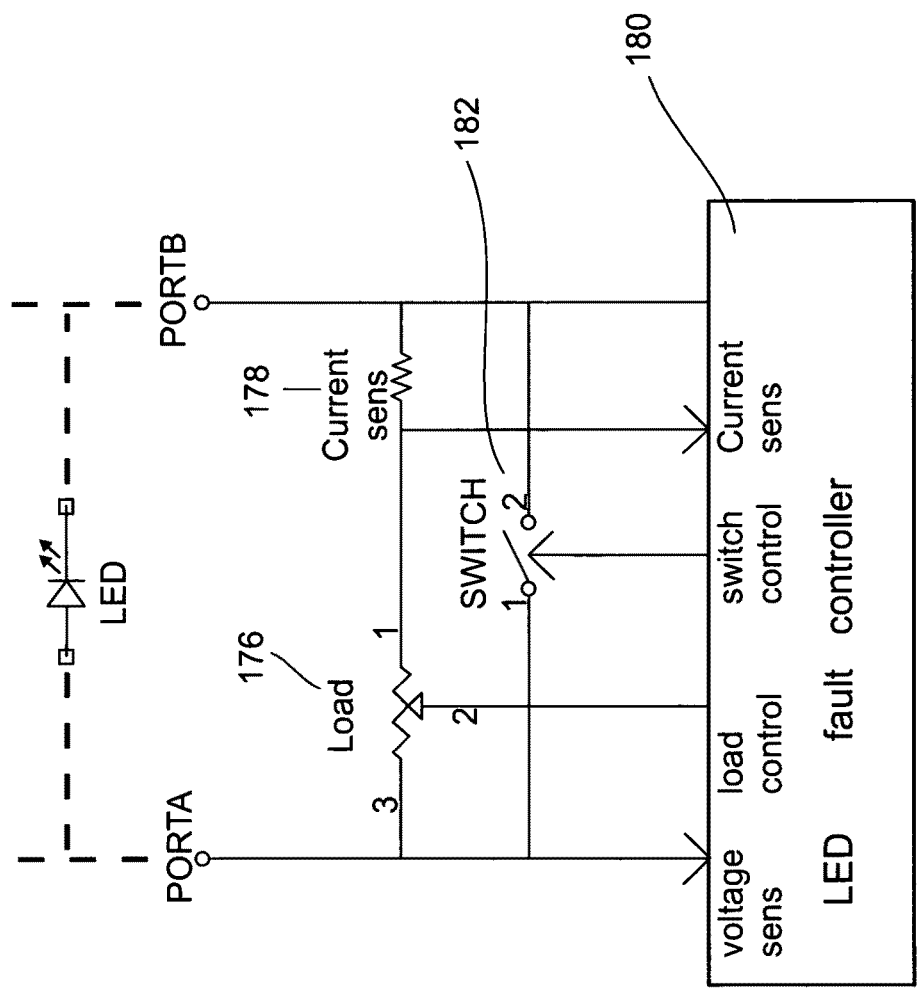
FIG. 15C is a simplified diagram showing the circuit protection of FIG. 15A in greater detail.

Reference is now made to FIG. 15C, which is a simplified diagram showing an exemplary embodiment of the circuit protection of FIG. 15B. In FIG. 15C the ports A and B connect either to individual LEDs or to a column of LEDs. Load 176 is a calibrated resistance for bypassing a failed LED as necessary. Current sensor 178 detects current and allows the current to be controlled. LED fault controller 180 measures the voltage drop of the branch and takes over when the voltage drop is seen to indicate a failure. The controller 180 may determine the nature of the fault and decide whether to add a load or bypass the column. The latter is achieved by closing bypass switch 182.

Figure 16:
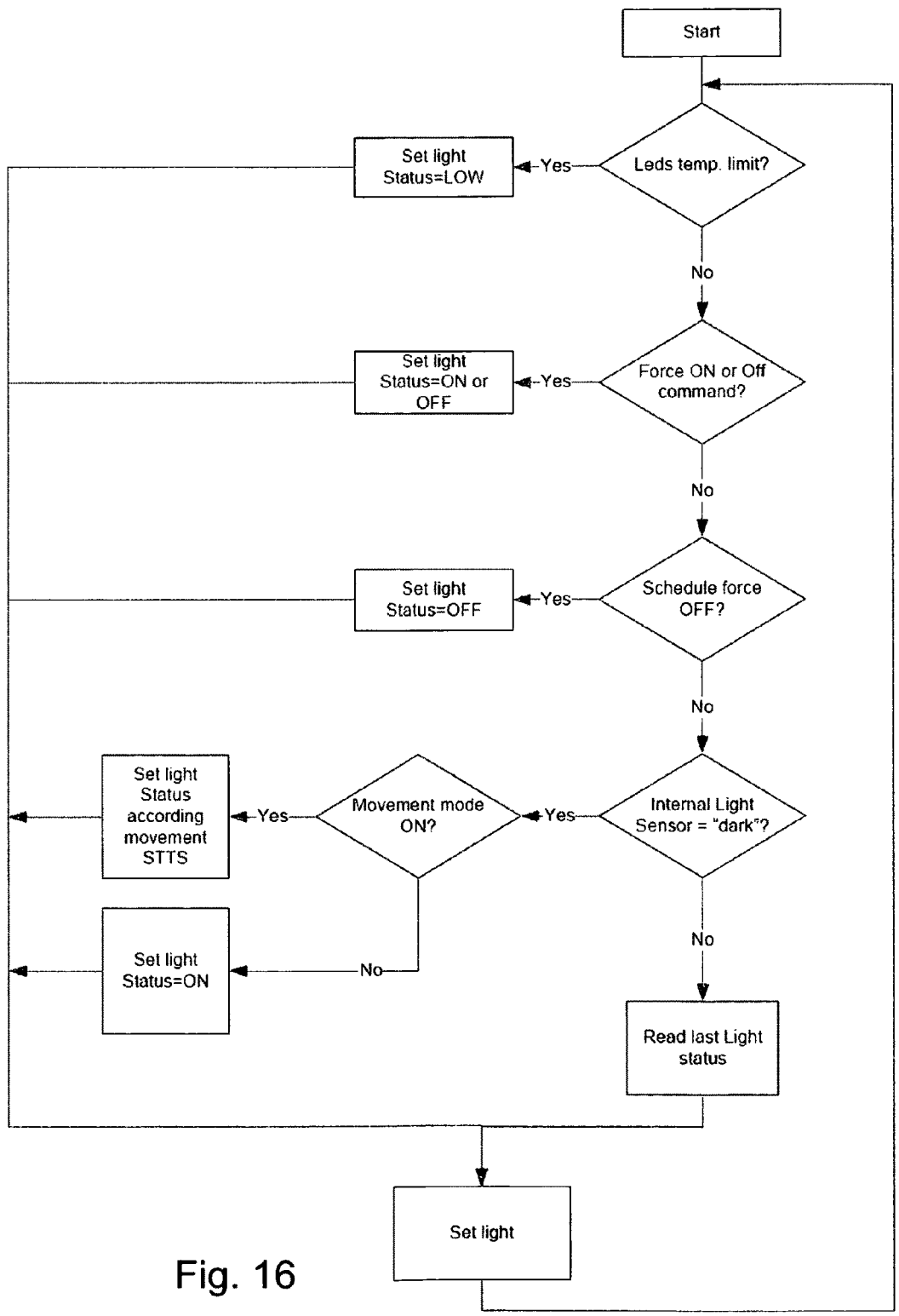
FIG. 16 is a simplified flow diagram showing operation of a lamp according to the present embodiments.

Reference is now made to FIG. 16 which is a flow chart indicating a process for controlling the LED lamp, using the light and temperature sensors of FIG. 15. In the flow chart a lamp is initially tested for temperature. If the lamp is too hot then the lamp status is set to low illumination. If the temperature is within the design limit then the lamp status is set on as per scheduling requirements. If the lamp is not currently scheduled to be on then the status is set to off In general a control temperature is set which is lower than the maximum temperature specified by the manufacturer. As the LEDs approach the control temperature the illumination is reduced until the temperature is stabilized. The control algorithm takes into account that a relatively large time constant exists in the system due to energy in the LEDs taking time to be diffused through the circuit and into the surroundings. That is to say the effect of reducing the LEDs at any given time will only stop heating at some time ahead.

If the light sensor reads the current state as light then the last light status, whether on or off, is checked for compatibility. The flow then switches to set the light to the current status. If movement mode is on, then the light status is set according to the presence or otherwise of movement. Movement status is useful for security lamps based on movement detectors, and for an embodiment in which street lighting is switched to low intensity when there is no activity in the vicinity. This latter embodiment may save considerable energy say in the early hours of the morning where there is often little activity in the streets.

Considering the possibility of movement monitoring in greater detail, one option is to base control of the lighting on traffic monitoring or local movement on the road and/or pavement. A local measurement may be made of motion including traffic conditions and compared to locally stored thresholds. The lamp may then be kept at maximum when there is a reasonable traffic level, at a lower level when there are just the occasional passing vehicles and possibly may be dimmed to a minimum or even switched off altogether in circumstances of no traffic at all.

A movement monitor may be set up in the locality and connected to nearby lamps. Alternatively a monitor may be located externally on the lampposts. One option is to locate a movement monitor internally on the circuit board with the LEDs or alongside. RF or PIR sensors may be used.

When the street lights are connected in a network, as per FIGS. 17 and 18 below, then a projection may be made of the movement of a vehicle or a pedestrian, who can be provided with a light path, lights switching on as he goes. In general a person traveling looks ahead, so it is not sufficient to switch a light on as soon as a pedestrian or vehicle is detected. Rather the motion and direction are detected and a series of lamps, say four lamps ahead is switched on to provide a light path for the projected motion.

In such a case, a lamp controller acts as a coordinator for a cluster and instructs lamps in the cluster to switch on and off as necessary.

FIG. 16 provides control within the lamp. One of the present embodiments further provides for external control of the lamp. Reference is now made to FIG. 17 which illustrates how a series of street lamps may be connected in a wireless network. Typically street lamps are spaced apart at regular intervals from their nearest neighbors and the distances there between can be covered by Cellular Net, for example GPRS, or WiFi type wireless connections. The street lights can thus all be connected via wireless connections so that any street light can be reached by relaying signals over the network. FIG. 17 illustrates a server 170 connected by wire to an existing network 172 and then via wireless connections to a coordinator 174, routers 176 and end devices 178. Coordinators and routers may be located on suitable lamp posts. End devices may comprise power, gas or watermetering or panic buttons or alarm systems or wireless computing devices.

The network may connect up all the street lights for control and monitoring purposes. The network may control lighting and extinguishing times for the street lights. Alternatively or additionally the network may control lighting intensity so that the intensity may be reduced say during the less active time of early morning. The network may allow lights to be switched between operation via light or motion sensor to operation according to timing or a combination of the two. A combination may involve the lights being lit at a certain time and remaining on regardless for a certain interval, and then, at a different interval being controlled via the motion sensor. The network may further allow fault monitoring and monitoring for energy usage, say for intelligent metering.

Furthermore the network may be used in conjunction with movement sensors to determine that an area is currently active or passive and alter the lighting intensity accordingly.

The network allows for connection to a central server, say via the Internet, for control of the lighting network. Lighting programs may be updated. The network may provide communication to allow for control of third party systems or for control or reading of public systems. The network allows reporting of faults, and may provide for limited communication for city authorities and even for the public.

Using the network, one possibility is to simply to provide a time switch in each light, and to occasionally send data to reprogram the time switch. Another possibility is real time switching from the server.

A further possibility is simply to switch the electricity supply to all the lamps on and off from a central switch.

Another possibility is to make a local decision based on light levels and their comparison with a threshold light level.

Measurement of light levels may be through an external sensor, or through an internal sensor whose view of the outside is shielded from the LEDs. In the embodiment illustrated above, the light sensor is in fact located with the LEDs on the same circuit board and is not shielded. Such a light sensor may be used by briefly switching off the LEDs to make the measurement. The measurement may be made in milliseconds so the operation need not be perceptible to passers-by. The embodiment of FIG. 17 may in one embodiment provide a full metropolitan-wide network for other uses by the city authorities or by the citizens. The lamp posts may be used as base stations for collecting information from domestic utility meters or from medical sensors or alarm devices, say for elderly people at home.

Figure 17:
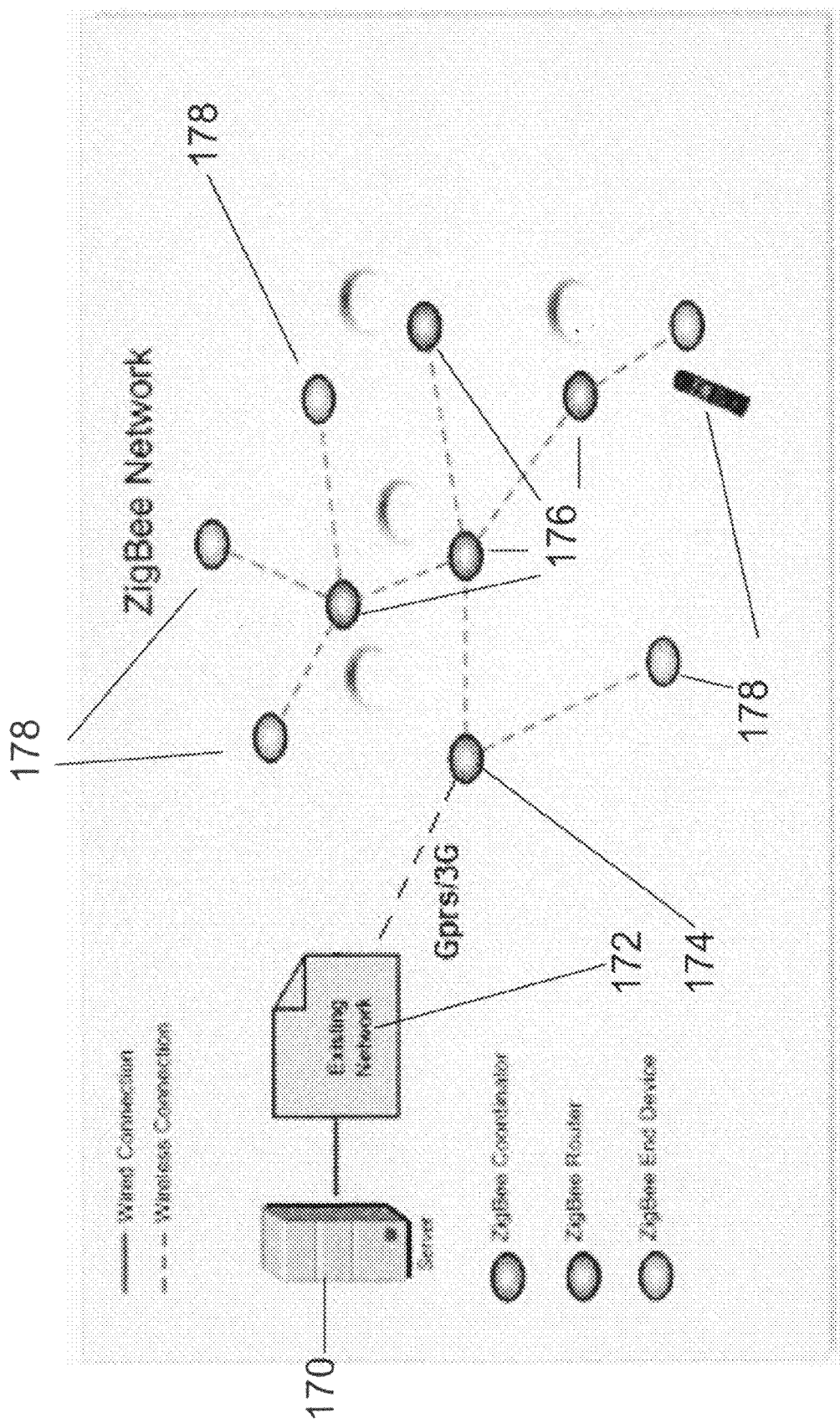
FIG. 17 illustrates a network configuration for connecting street lighting systems according to the present embodiments for remote control.

In one embodiment, as illustrated in FIG. 17, a network according to the Zigbee standard is used. The Zigbee standard provides a network that makes ad hoc connections over a mesh according to current routing demands and is optimized for low volume traffic and low power use, such as would be expected in the case of control information for street lighting and like uses. The mesh nature of the network allows for traffic routing to be altered when new buildings are put up, new street lights are added or when atmospherics disturb communications, or even for rerouting a transmission when a large vehicle disrupts a link. Changes in frequencies, or transmission power or transmission rates are all supported.

If the network is designed with sufficient capacity it may be an inexpensive way of providing a system of city-wide wireless internet. In this case however the IEEE 802.11 may be a more appropriate basis for the network than the Zigbee standard. Mesh networks may alternatively be implemented using WiFi technology, and the latter is preferable when larger bandwidths are required.

An Internet bridge may be used to connect between the street lighting network and the Internet. Such a bridge may be a 3G/GPRS modem, using TCP/IP to connect to the Internet.

A router may be used at each lamp post. The router both relays data and route to another destination and sends information to and from the local devices.

A coordinate unit allows for coordinating the local cluster of lamp posts. The coordinator forms the root of the network tree and may bridge to other networks as necessary. There may be exactly one coordinator in each network, which is able to store information about the network, including acting as the Trust Centre & repository for security keys.

Figure 18:
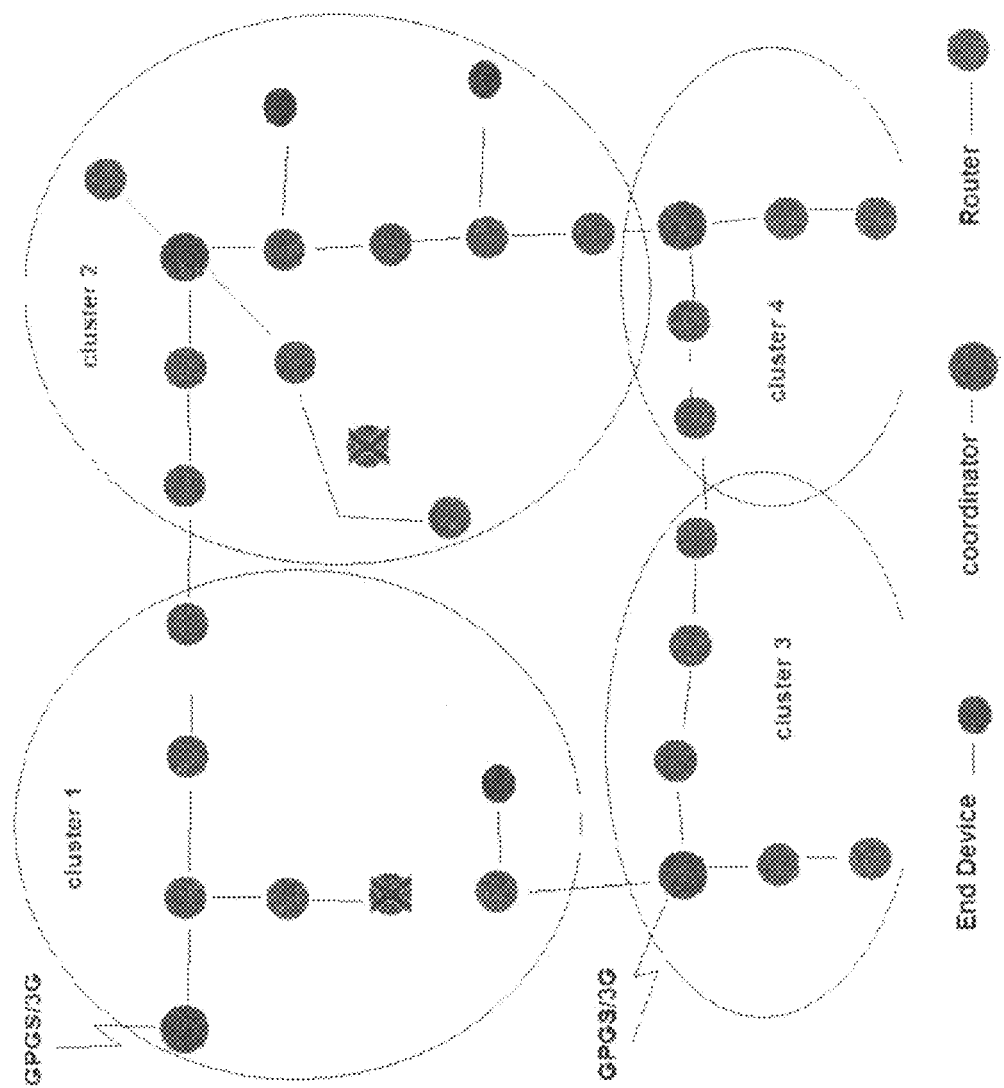
FIG. 18 illustrates clustering possibilities within a network such as that shown in FIG. 17.

FIG. 18 illustrates clustering possibilities within a network such as that shown in FIG. 17. As explained, the network structure is easily changed as necessary.

As an alternative to using a wireless connection, the devices may transfer data via the power connection, using a suitable PLC modem.

Figure 19:
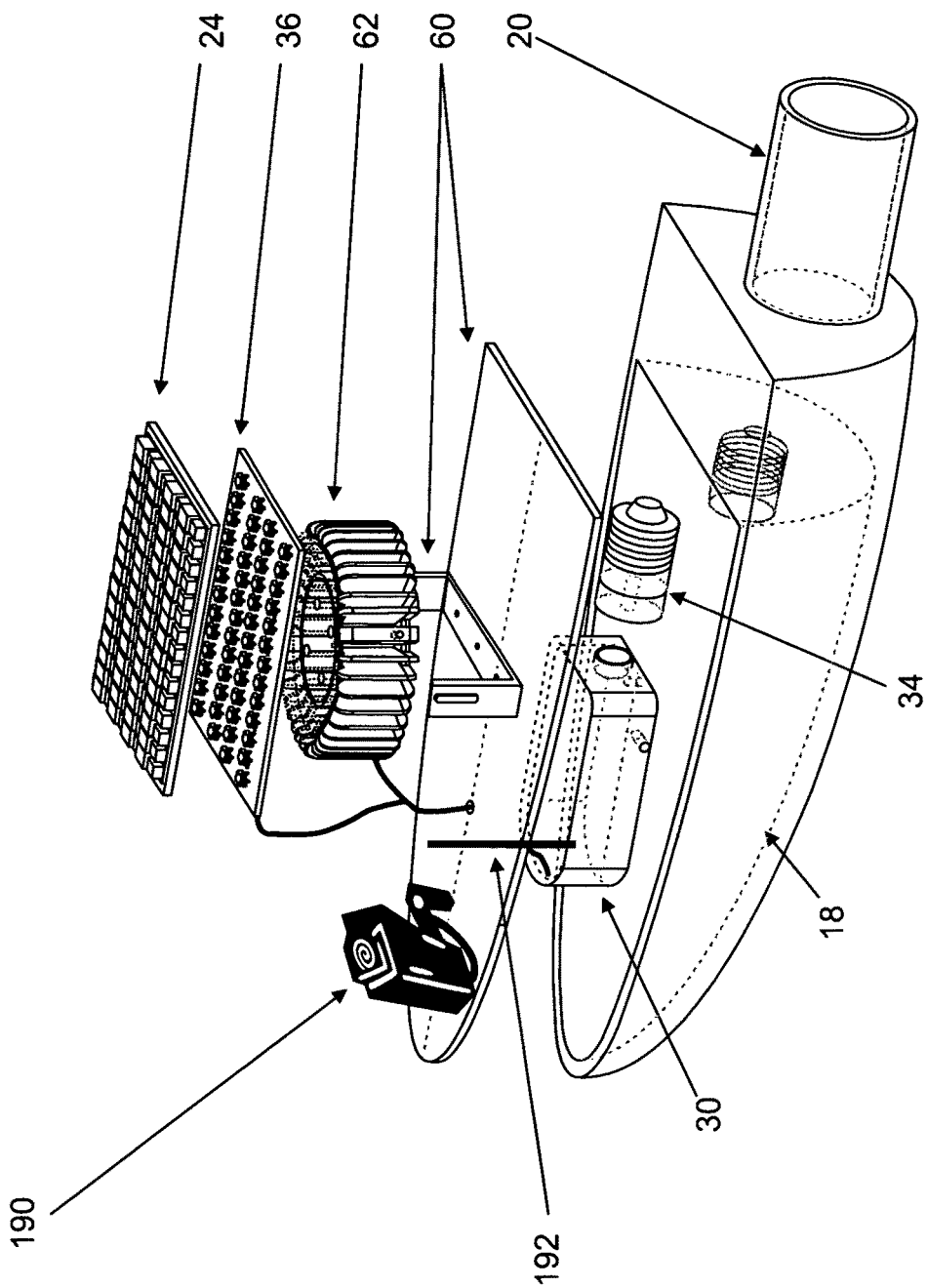
FIG. 19 illustrates an embodiment of a light fitting including a camera, according to an embodiment of the present invention.

Reference is now made to FIG. 19, which is a simplified diagram showing a lamp fitting in which a camera 190 is connected via fitting 192 to cover 60 and to electronic box 30. Alternatively, camera 190 may be inserted on printed circuit board 36 on which the LEDs are fitted.

Still and video images may be transmitted over the network. Further cameras may be fitted in the vicinity of the light fitting and themselves transmit wirelessly to the relay at the light fitting for passing along the network. Thus local law enforcement authorities are provided with the possibility of setting up a surveillance network using an existing city-wide lighting system. In general the cost of physically setting up a surveillance network exceeds the cost of the hardware itself. The use of an existing street-lighting network leads to a significant reduction in this cost. However existing networks generally do not receive electric power during the daytime and do not provide any infrastructure for connecting the cameras to the control center.

The present embodiments solve the above problems by providing both for intelligent switching and for communications, allowing the camera system to co-exist with the lighting system. The network may be used both to provide control signals to the camera and to pass on images and video. In particular, if the network is based on WIFI, then relatively high data rates can be achieved. As well as crime surveillance, the cameras may serve for reporting traffic conditions and the like.

As well as cameras, movement sensors and other sensors of the surroundings may be used to report data to a central observation center or the like.

The cameras or other sensors may be placed on the printed circuit board with the LEDs, or on the external mounting used for the LEDs, or on the light fitting, or on the street light mounting itself.

The power supply for the camera may be the same power supply as for the LEDs, or may be a different power supply. The other power supply may or may not be connected to the screw in adaptor discussed above.

Figure 20:
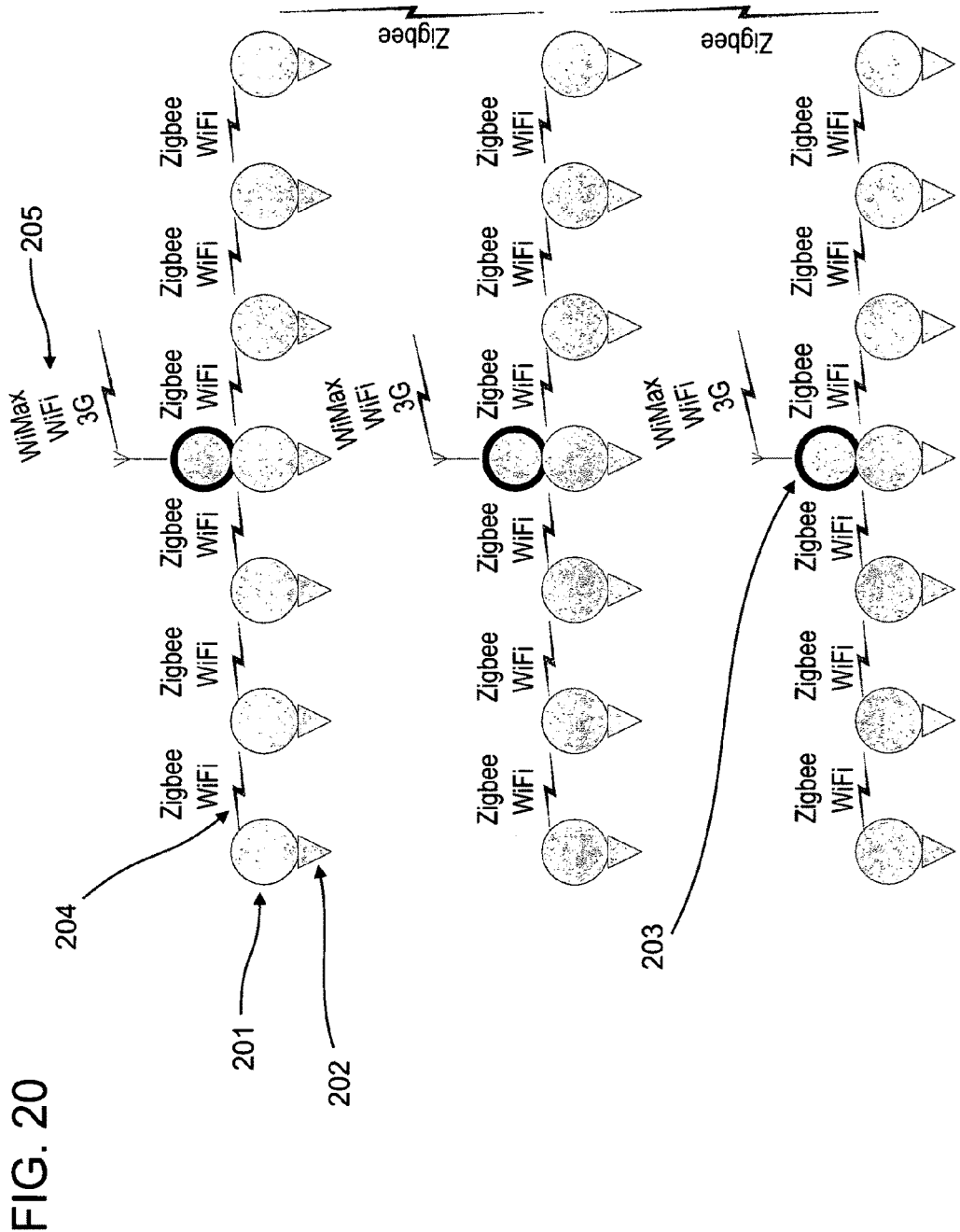
FIG. 20 illustrates a network of street lights including cameras.

Reference is now made to FIG. 20. Street lighting installation 201 includes still camera or video camera 202. A wireless modem transmits data within the local cluster of lamp posts using local wireless network 204 which may be Zigbee or WIFI. Modem 203 is located in one of the street lamps of the cluster and connects to the Internet via a broadband connection, WIMAX or WIFI or 3G.

In one embodiment, the same network connections may be used for the cameras as for the lighting, or another, wider bandwidth network may be used in parallel. Thus a Zigbee network may be used for lighting and a WIFI network for the cameras. Alternatively the Zigbee network may be used for lighting and for control of the cameras, and WIFI for the camera images and video. WIFI, WIMAX In one embodiment each lamppost may include a module for cellular Internet connection, a module for WIMAX local wireless connection and a module for fast WIFI Internet connection. Thus a local hotspot may be created giving a useful choice for users.

It will be appreciated that with large numbers of cameras, there may nevertheless not be sufficient bandwidth to transmit images from all of them simultaneously. Thus a system of scanning the cameras may be used. The scanning may be modified if a controller wishes to obtain more detail from a particular camera, and certain cameras at more strategic locations, say at major traffic junctions, may be assigned greater bandwidth.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An LED lamp fitted within a closed legacy light fitting, the LED lamp for fitting into said legacy light fitting having a screw-in socket designed for rotary insertion of a bulb, the LED lamp comprising a plurality of light emitting diodes arranged over a surface of the lamp, the lamp being rotatably connected via a snap-in connection to an independently rotatable screw-in adaptor for insertion into the screw-in socket, the independently rotatable electrical connection being rotatable independently of the lamp by direct application of rotation to make an electrical connection to said socket, the legacy light fitting being insufficiently sized to allow rotation therein of the LED lamp, the LED lamp comprising a plurality of light emitting diodes over a surface, a heat sink located within said closed legacy light fitting and thermally coupled to said surface and a fan, within said closed light fitting for driving cool air over said heat sink, said fan configured to draw said cool air from a first hole inserted in said closed fitting and leading to said LED lamp, and to drive said air past said heat sink within said closed light fitting to a second hole inserted in said closed light fitting, the lamp further comprising a detection mechanism, the detection mechanism comprising a voltage detector configured to detect a failure of a light-emitting diode, and at said detection, carry out active switching to insert itself to take a voltage drop equivalent of one light emitting diode at the place of said failed light emitting diode, thereby to maintain pre-existing voltage conditions at respective remaining diodes.

2. The LED lamp of claim 1, further comprising a transceiver for a wireless or powerline connection for remote control and monitoring, said lamp further comprising a camera, configured to transmit images using said wireless connection.

3. The LED lamp of claim 1, with controlling electronics, for fitting into said closed light fitting, the lamp being built around a cover dimensioned for placing over an opening of said closed light fitting, the lamp being built such that said surface with said light emitting diodes is on a first side of said cover and said controlling electronics is on a second side of said cover, and said first side is placed to face outwardly of said closed light fitting, said lamp further comprising a transceiver for a wireless connection for remote control and monitoring, said lamp further comprising a camera, configured to transmit images using said wireless connection.

4. A system for combined street-lighting and surveillance, comprising a plurality of legacy outdoor lighting installations, said legacy outdoor lighting installations being intended for insertion of bulb-type lamps that are able to rotate within said installations, said LED lamps being unable to rotate within said installations, each outdoor lighting installation comprising an LED lamp inserted therein, the LED lamp being rotatably connected through a snap-in electrical connection to a screw-in adaptor for insertion into a screw-in socket of a respective installation, the screw-in socket being designed for rotatable insertion of a bulb the screw in adaptor being rotatable by application of rotation to said screw in adaptor, to rotate said screw-in adaptor independently of the lamp, the independent rotation applied to the screw-in adaptor making an electrical connection with said socket , the system further comprising a detection mechanism, the detection mechanism comprising a voltage detector configured to detect a failure of a light-emitting diode, and at said detection, carry out active switching triggered by said detection to insert itself to take a voltage drop equivalent of one light emitting diode at the place of said failed light emitting diode, thereby to maintain pre-existing voltage conditions at respective remaining diodes;

and at least some of said outdoor lighting installations further comprising a respective camera, said cameras being connected to receive power via respective screw-in adaptors.

5. The system of claim 4, said outdoor lighting installations being networked together for communication, said networking providing control for said street lamps and said cameras and for transmitting images from said cameras to a controller.

* * * * *